United States Patent [19]

Testardi

[11] Patent Number: 5,067,778
[45] Date of Patent: Nov. 26, 1991

[54] HIGH PERFORMANCE ANTI-LOCK BRAKE SYSTEM FOR ORIGINAL EQUIPMENT AND AFTER-MARKET APPLICATIONS

[76] Inventor: David A. Testardi, 7230 Pimmit Ct., Falls Church, Va. 22043

[21] Appl. No.: 615,260

[22] Filed: Nov. 19, 1990

[51] Int. Cl.$^5$ .............................................. B60T 8/00
[52] U.S. Cl. ................................ 303/113 R; 303/20; 303/119 SV; 303/DIG. 4; 303/115 EC
[58] Field of Search .................... 303/20, 16, 119, 116, 303/113, 115, 110, DIG. 4, 100; 188/72.1

[56] References Cited

U.S. PATENT DOCUMENTS

| 3,731,979 | 5/1973 | Mikaila | 303/119 |
| 3,744,852 | 7/1973 | Riordan | 303/104 |
| 4,629,039 | 12/1986 | Imoto et al. | 188/72.1 |
| 4,690,465 | 9/1987 | Takeda et al. | 303/119 |
| 4,705,323 | 11/1987 | Imoto et al. | 303/116 |
| 4,762,300 | 8/1988 | Inagaki et al. | 303/119 |
| 4,775,195 | 10/1988 | Miller | 308/DIG. 4 |
| 4,802,562 | 2/1989 | Kuroyanagi et al. | 303/20 |
| 4,826,256 | 5/1989 | Von Hayn et al. | 303/61 |

FOREIGN PATENT DOCUMENTS

| 152344 | 8/1985 | European Pat. Off. | |
| 2154227 | 5/1973 | Fed. Rep. of Germany | |
| 3318326 | 12/1984 | Fed. Rep. of Germany | |
| 3441380 | 5/1986 | Fed. Rep. of Germany | |
| 3545800 | 7/1986 | Fed. Rep. of Germany | 188/72.1 |
| 57-140263 | 8/1982 | Japan | |
| 60-139927 | 7/1985 | Japan | |
| 60-139928 | 7/1985 | Japan | |

Primary Examiner—Matthew C. Graham

[57] ABSTRACT

A high performance anti-lock brake system is suitable for both original equipment and after-market applications. The system comprises a conventional hydraulic link between a master cylinder and a wheel cylinder. A cut-off valve is provided to separate the hydraulic link into an upstream portion and a downstream portion. A one-way valve is provided in parallel relation to the cut-off valve to ensure the possibility of hydraulic communication from the wheel cylinder to the master cylinder at all times. Downstream of the valves, piezoelectric discs are provided within the hydraulic link. When a skid condition is sensed, for example, by monitoring a ratio between the rate of change of wheel deceleration and the rate of change of hydraulic force at the wheel cylinder, brake force control is initiated. A controller closes the cut-off valve and controls the voltage applied to the piezoelectric discs to contract the discs, thereby reducing the pressure in the wheel cylinder. Thereafter, the voltage applied to the piezoelectric discs is increased to produce maximum vehicle braking. When the voltage applied to the piezoelectric discs equals or exceeds a predetermined value, the cut-off valve is opened and brake force control is terminated.

20 Claims, 11 Drawing Sheets

HIGH PERFORMANCE ANTI-LOCK BRAKE SYSTEM FOR ORIGINAL EQUIPMENT AND AFTER-MARKET APPLICATIONS

BACKGROUND OF THE INVENTION

1. Field of the Invention

This invention pertains to the field of anti-lock brake systems which are employed in wheeled vehicles to prevent the locking or skidding of the vehicle wheels when the vehicle brakes are applied. More specifically, this invention pertains to the field of anti-lock brake systems which actively control the braking force produced by the vehicle brakes in response to a sensed incipient wheel skid condition in order to produce a maximum braking effort until such a time as the possibility of a dangerous wheel skid no longer exists.

2. Description of Related Art

Various systems have been proposed for preventing the locking or skidding of the vehicle wheels when the vehicle brakes are applied. A current trend in automotive hydraulic brake system design is to provide each brake line in the brake system with access to a drain and an auxiliary pressure source. A first solenoid valve is employed between the brake line and the drain to permit controlled draining of brake fluid from the brake line when it is necessary to relieve hydraulic braking pressure in the brake line. The pressure source is selectively communicated with the brake line through a second solenoid valve to readmit the drained brake fluid into the brake line when it is necessary to increase the hydraulic braking pressure. In this manner, the two solenoid valves can be selectively controlled in order to modulate the hydraulic pressure at the wheel cylinder between a low and a high level. Such modulation of the hydraulic pressure at the wheel cylinder is generally controlled by a microprocessor and occurs independently of the hydraulic pressure in the operator controlled master cylinder. Specifically, during braking, the microprocessor continually receives inputs from wheel speed sensors and calculates the magnitudes and/or rates of change of angular deceleration of the vehicle wheels. From this information, the microprocessor determines whether or not any incipient wheel skid conditions exist. If an incipient wheel skid condition exists at any particular wheel, the microprocessor immediately isolates the brake line leading to the particular wheel from the master cylinder and then outputs a first electrical signal to energize the first solenoid valve to establish communication between the brake line and the drain. Thus, the hydraulic pressure in the wheel cylinder is immediately reduced to a low level and stays reduced until such a time as the microprocessor determines that the particular wheel is rolling again. When the wheel has regained traction (that is, when the wheel is rolling again), the microprocessor immediately outputs a second electrical signal to energize the second solenoid valve to establish communication between the pressure source and the brake line, thereby allowing the pressure source (which can typically comprise a hydraulic pump driven by an electric motor) to pump the drained brake fluid back into the brake line. Consequently, the hydraulic pressure in the wheel cylinder increases and continues to increase until such a time as the microprocessor determines that the particular wheel is skidding again. Thereafter, the microprocessor must immediately output the first electrical signal again until it determines that the particular wheel is rolling, followed by the second electrical signal, then the first, and so on. Additionally, some of the current anti-lock brake systems provide valve means for allowing the microprocessor to maintain the hydraulic pressure in the wheel cylinder constant for brief periods of time. One example of this kind of system is disclosed in U.S. Pat. No. 4,676,353, herein incorporated by reference. All in all, it is the current trend in anti-lock brake systems to modulate (i.e increase or decrease) the hydraulic pressure in the wheel cylinders of skid controlled wheels at a rate of between 7 and 20 times a second.

It has been known that the maximum possible braking force between a wheeled vehicle and, for example, a dry road surface is achieved when the slip between the decelerating wheels and the road surface is maintained at a level between about 10% and 20%. That is to say, in order to stop a wheeled vehicle in the shortest possible distance, the vehicle wheels should be retarded with a force which causes the tire surfaces on the wheels to slip (in the braking or decelerating direction) relative to the road surface by an amount (i.e a distance) equal to between about 10% and 20% of the distance travelled by the vehicle during braking.

It becomes apparent then that the current anti-lock braking systems as described above are not designed to provide the maximum possible braking of a vehicle during a skid control operation because they are not designed to maintain the wheel slip during deceleration at an amount which is between about 10% and 20%. Rather, these systems have been designed to prevent the vehicle wheels from locking completely and to ensure that a good (though not optimum) level of traction is maintained during braking.

Moreover, owing to their relative complexity, the current anti-lock brake systems have heretofore been offered only as original equipment on new vehicles. No system has been proposed which meets the needs of those consumers who have bought vehicles in the past without anti-lock brakes systems but now want to retrofit such systems to their vehicles. That is, no after-market anti-lock brake systems are currently available.

The following patent documents, incorporated herein by reference, reveal brake systems which are similar in one or more respects to the anti-lock brake system of the present invention:

| Origin | Document Number |
| --- | --- |
| U.S. | 3,731,979 |
| U.S. | 4,705,323 |
| U.S. | 4,826,256 |
| Japan | 57-140263(A) |
| Japan | 61-139927(A) |
| Japan | 61-139928(A) |
| European Pat. Office | 152344(A) |
| Fed. Rep. Germany | DE-O 2154227 |
| Fed. Rep. Germany | DE-O 3318326 |
| Fed. Rep. Germany | DE-O 3441380 |

SUMMARY OF THE INVENTION

It is an object of the invention to provide an anti-lock brake system which is operative during a skid control operation to control a braking force at the vehicle brakes so as to stop the vehicle in the shortest possible distance.

It is another object of the invention to provide an anti-lock brake system capable of controllably adjusting the hydraulic pressure in the wheel cylinders at rates up to 100 times or more a second in order to ensure that the optimum brake pressures exists in the wheel cylinders at all times.

It is another object of the invention to provide an aftermarket anti-lock brake system which is virtually fail-safe in operation and which can be easily retrofitted to vehicles purchased without anti-lock brake systems.

It is another object of the invention to integrate a tail-light control system with the anti-lock brake system so as to warn closely following vehicles of the operation of the anti-lock brake system and therefore more fully realize the safety potential of the anti-lock brake system.

Specifically, the invention comprises an anti-lock brake system having a master cylinder having a master cylinder piston mounted for reciprocal movement therein; actuating means for moving the master cylinder piston when an operator of the vehicle operates a vehicle brake actuating device; a wheel cylinder having a wheel cylinder piston which is mounted for reciprocal movement therein; a rotatable brake element connected for rotation with a wheel of a vehicle; a non-rotatable brake element interposed between the wheel cylinder piston and the rotatable brake element; a hydraulic link comprising a volume of constrained working fluid interposed between the master cylinder piston and the wheel cylinder piston so as to hydraulically link movement of the master cylinder piston with movement of the wheel cylinder piston, whereby when the vehicle operator operates the brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle; a valve means provided in the hydraulic link for controlling a condition of fluid communication between the master cylinder and the wheel cylinder, wherein the valve means is controllable to selectively provide either one of a first condition which allows two way fluid communication between the master cylinder and the wheel cylinder and a second condition which allows exclusive one way fluid communication from the wheel cylinder to the master cylinder, wherein an upstream portion cf the hydraulic link is defined between the master cylinder piston and the valve means and a downstream portion of the hydraulic link is defined between the wheel cylinder piston and the valve means, and wherein the downstream portion of the hydraulic link defines a predetermined internal volume within which the working fluid is substantially constrained when the movement of the wheel cylinder piston has urged the non-rotatable brake member into frictional engagement with the rotatable brake member; piezoelectric means, comprising at least one piezoelectric element to which a voltage potential is applied, for increasing and decreasing the predetermined internal volume of the downstream portion of the hydraulic link in response to changes in a magnitude of the voltage potential applied to the piezoelectric element; wheel speed sensing means for producing a wheel speed signal indicative of a rotational speed of the wheel; and a controller electrically connected to the valve means, the piezoelectric means, and the wheel speed sensing means; wherein the controller comprises: skid determining means for determining the existence of an incipient wheel skid condition at the vehicle wheel on the basis of at least the wheel speed signal; normal braking mode control means, operative when the incipient wheel skid condition does not exist, for controlling the valve means to provide the first condition of fluid communication between the master cylinder and the wheel cylinder; cut-off means, responsive to the determined existence of the incipient wheel skid condition, for controlling the valve means to provide the second condition of fluid communication between the master cylinder and the wheel cylinder; pressure decreasing means, operative after the second condition of fluid communication has been established, for controlling the magnitude of the voltage potential applied to the piezoelectric element so as to cause the piezoelectric element to contract, thereby increasing the internal volume of the downstream portion and reducing a hydraulic pressure in the wheel cylinder to alleviate the incipient wheel skid condition; means for sensing an alleviation of the incipient wheel skid condition, on the basis of at least the wheel speed signal; pressure increasing means, responsive to the sensed alleviation of the incipient wheel skid condition, for controlling the voltage applied to the piezoelectric element so as to cause the piezoelectric element to expand, thereby decreasing the internal volume of the downstream portion and increasing the hydraulic pressure in the wheel cylinder; monitoring means for monitoring the voltage applied to the piezoelectric element; and normal braking resume means for controlling the valve means to provide the first condition of fluid communication between the upstream portion and the downstream portion of the hydraulic link when the voltage applied to the piezoelectric element has reached a predetermined voltage.

The invention further provides that the rotatable brake element comprises a ventilated brake disc having a plurality of circumferentially spaced webs which join together a pair of disc faces, and the wheel speed sensing means is positioned so as to sense the passing of the webs as the vehicle wheel rotates, thereby producing the wheel speed signal based on a frequency of the passing webs.

In other aspects of the invention, the valve means and the piezoelectric means are provided within a module attached to a frame or body portion of the vehicle in such a manner that the piezoelectric means is located within an auxiliary chamber downstream of the valve means, wherein the upstream portion comprises a first brake line section, the downstream portion comprises a second brake line section, wherein the second brake line section comprises a flexible brake line, and wherein the module is interposed between the first brake line section and the second brake line section.

Moreover, according to the invention, means are provided for determining a magnitude of a hydraulic force acting on the wheel cylinder piston, and the skid determining means determines the existence of the incipient wheel skid condition based on both the wheel speed signal and the determined hydraulic force acting on the wheel cylinder piston. More particularly, the skid determining means determines a quantity representative of a ratio between a rate of change of the determined hydraulic force and a rate of change of rotational deceleration of the wheel as determined from the wheel speed signal, wherein the quantity is then used by the skid determining means, according to a mathematical relation, to determine the existence of the incipient wheel skid condition. Specifically, according to the invention, the existence of the incipient skid condition is determined when the quantity is greater than or equal to a predetermined number.

In yet another aspect of the invention, the means for determining the hydraulic pressure in the downstream portion of the hydraulic system comprises at least one piezoelectric element, and the piezoelectric element which the means for determining the hydraulic force comprises is the same piezoelectric element which the piezoelectric means comprises.

Moreover, according to the invention, the vehicle brake actuating device comprises a brake pedal, switch means are provided for providing a signal to the controller upon initial depression of the brake pedal, and the controller further comprises: expanding means responsive to the signal from the switch means for applying a voltage to the piezoelectric element to expand the piezoelectric element upon the initial depression of the brake pedal, thereby decreasing the response time of the brake system.

The invention will, however, be best understood by reviewing the following specification in conjunction with the accompanying drawings, in which:

BRIEF DESCRIPTION OF THE DRAWINGS

FIG. 3, which comprises

DESCRIPTION OF THE PREFERRED EMBODIMENTS

The present invention is designed to take advantage of known changes which occur in the coefficient of friction between a tire surface of a rotating wheel and a road surface as the tire surface starts to slip on the road surface. The graph in FIG. 1 represents this phenomenon.

In order for a tire to generate a braking force to decelerate a vehicle relative to a road surface, a certain amount of slip between the tire surface and the road surface must be developed. For example, under severe braking conditions, a vehicle operator might produce a relatively high controlled pressure in the brake master cylinder, thereby producing an amount of slip and a coefficient of friction corresponding to the point A in FIG. 1. The operation of the brakes at the point A is stable. That is, if a differential increase in brake pressure occurs at this point causing the wheel slip to increase, such an increase in wheel slip will necessarily cause an increase in the coefficient of friction between the tire and the road surface so as to increase tire traction and consequently reduce the increased wheel slip. Therefore, a skid will not occur. On the other hand, a professional driver with a well-balanced brake system might stably operate at the point A' on the curve, thereby producing a larger coefficient of friction and, therefore, even greater tire traction and stopping ability.

Figure 1:
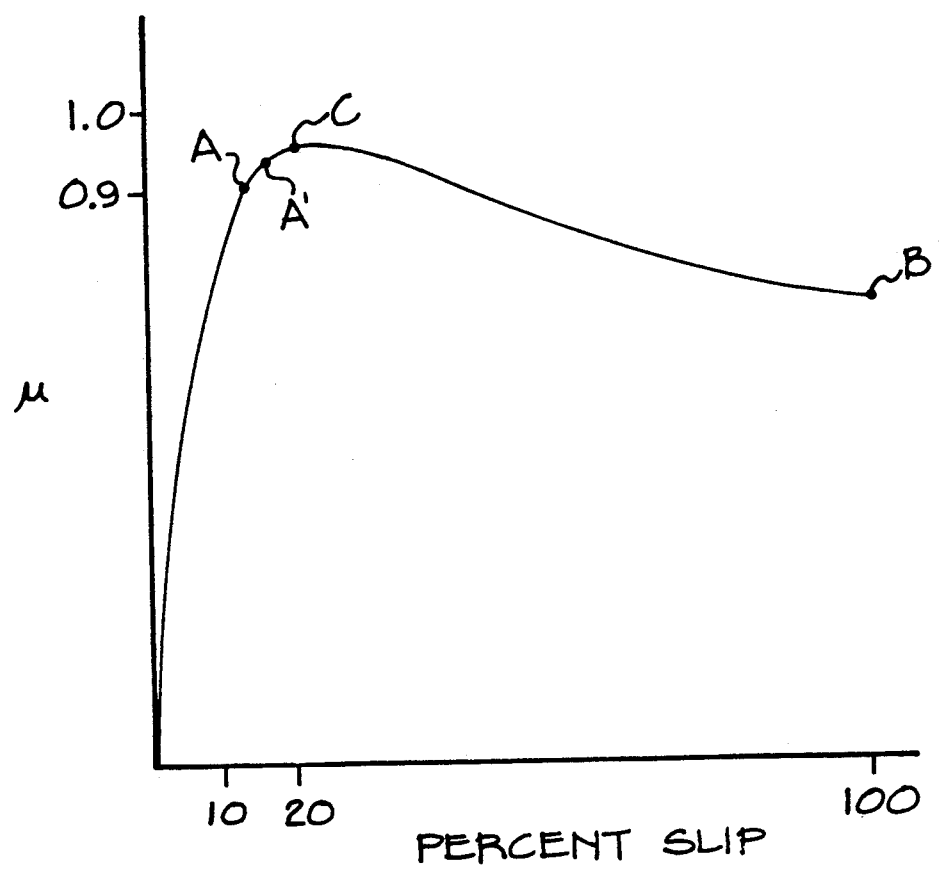
FIG. 1 is a conventional graph of the coefficient of friction between a vehicle wheel and a road surface vs. percent wheel slip.

However, if a driver produces an excessive braking force in the brake master cylinder, the amount of wheel slip will increase, and the operating point on the curve in FIG. 1 will shift to the right. As soon as the wheel slip increases to a point where the slope of the curve in FIG. 1 becomes negative, the operation of the brakes becomes unstable. That is, the increases in wheel slip will cause decreases in the coefficient of friction between the tire and the road surface which will in turn precipitate a skid condition (as represented by a rapid rightward shifting of the operating point). Thus, the operating point in FIG. 1 will shift to the point B, wherein the vehicle wheels are locked and a relatively small (kinetic) coefficient of friction will be developed between the tire and the road surface.

The magnitude of the coefficient of friction which is available between the tire surfaces and the road surface during braking directly determines the maximum amount of braking force which can be developed between the vehicle and the road. Similarly, the maximum amount of braking force which can be developed between the vehicle and the road directly determines the maximum deceleration of the vehicle (neglecting air resistance), which in turn determines the minimum stopping distance of the vehicle. Therefore, the higher the coefficient of friction is between the tire surface and the road surface, the shorter the minimum stopping distance for that vehicle will be. Accordingly, it is possible to stop a vehicle quicker when the vehicle wheels are kept rolling than when the vehicle wheels lock and skid.

As seen in FIG. 1, there is a point on the curve where the magnitude of the coefficient of friction between the tire surface and the road surface is at a maximum. This point, shown at C in FIG. 1, usually occurs when there exists between 10% and 20% slip between the tire surface and the road surface. The coefficient of friction at this point may be as high as 0.95 (at low vehicle speeds) for a passenger vehicle travelling on a dry road surface. Consequently, it becomes apparent that in order to produce maximum braking in a vehicle, it will be necessary for the anti-lock brake system according to the present invention to maintain the percent wheel slip and the coefficient of friction at or very near this point C.

Figure 2:
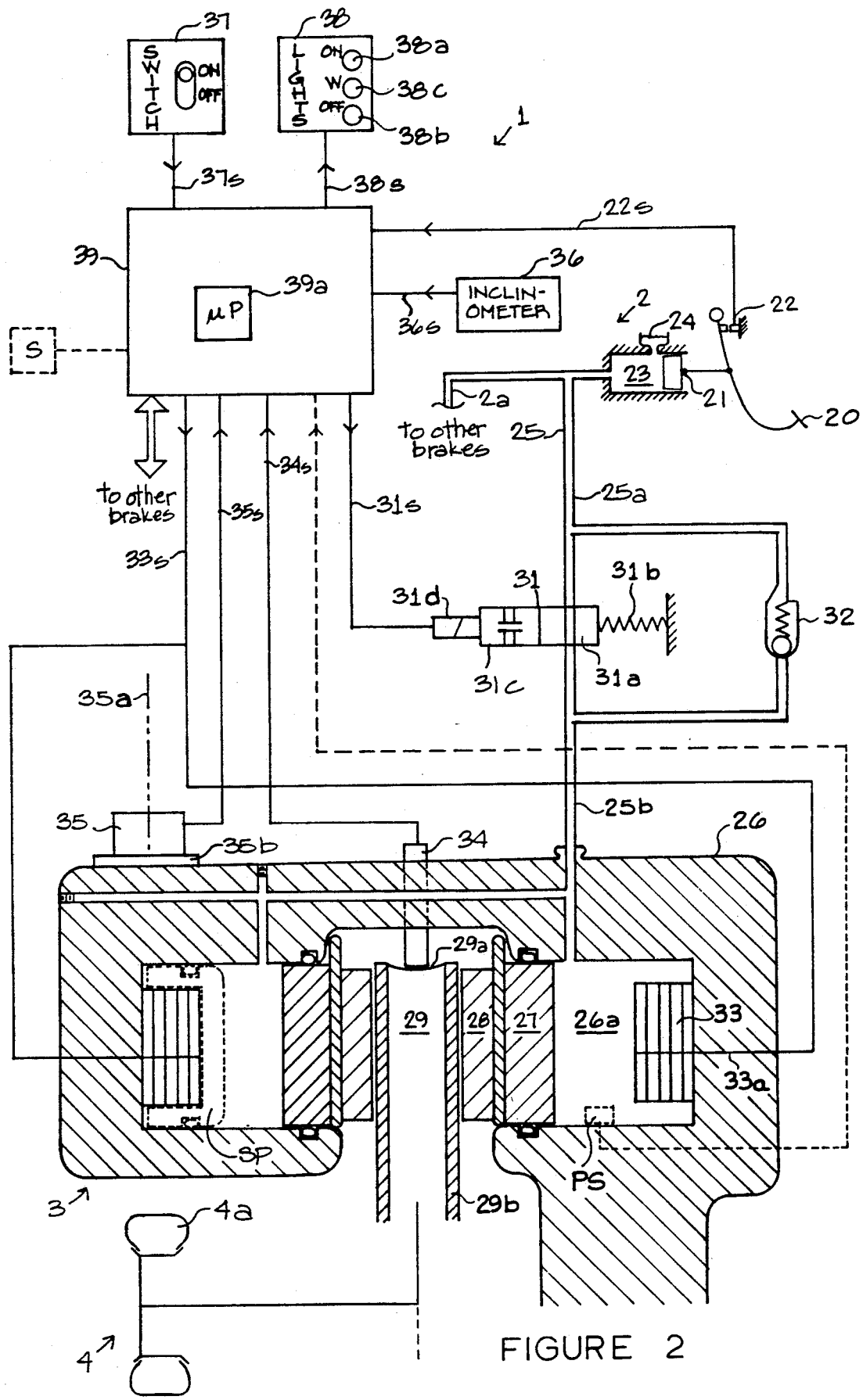
FIG. 2 is a diagram of the anti-lock brake system employing piezoelectric discs according to the present invention.

Referring now to FIG. 2, an anti-lock brake system 1 according to the present invention includes a hydraulic brake system 2. The hydraulic brake system 2 comprises a brake pedal 20, a brake push-rod and piston 21, a brake pedal switch 22, a master cylinder 23, a brake fluid reservoir 24, a brake line 25, a dual piston caliper 26 (made e.g. from aluminum), a pair of pistons 27, a pair of brake pads 28, and a (e.g. steel, or in some instances, cast-iron or aluminum-silicon alloy) ventilated brake disk 29 (which is connected, as shown only schematically, to a vehicle wheel 4 carrying a tire 4a). The components 21 to 29 will normally operate in a conventional manner. That is, initial depression of the brake pedal 20 by the driver will first cause the brake pedal switch 22 to open and then the reservoir 24 will become hydraulically isolated from the master cylinder 23 (as the movement of the brake piston 21 in the master cylinder 23 closes the opening leading to the reservoir 24). Thereafter, further depression of the brake pedal 20 will cause hydraulic pressure to develop in the master cylinder 23. The hydraulic pressure is then transmitted through the brake line 25 to the caliper 26 to cause the pistons 27 to converge on the ventilated disc 29, thereby producing a frictional braking force between the brake pads 28 and the ventilated disc 29. Although only one brake line 25 and caliper 26 is illustrated, it will be apparent that any number of vehicle brake lines and calipers may be serviced by the master cylinder 23, as shown schematically at 2a in FIG. 2.

According to the invention, the anti-lock brake system 1 is provided with brake force control means indicated generally at 3. The brake force control means 3 comprises elements 31 to 39 which are described below.

A solenoid cut-off valve 31 in the brake line 25 is normally biased to an open position 31a by a spring 31b and is shiftable against the bias of the spring 31b to a closed position 31c by a solenoid 31d. A check valve 32 is disposed in the brake line 25 in parallel relationship with the solenoid valve 31 and operates only to allow a flow of brake fluid from the caliper 26 to the master cylinder 23 and not vice-versa.

This arrangement of the valves 31 and 32 in the brake line 25 divides the brake line 25 into an upstream portion 25a (in constant fluid communication with the master cylinder 23) and a downstream portion 25b (in constant fluid communication with the brake caliper 26). Consequently, when the valves 31 and 32 are both closed, the downstream portion 25b of the brake line 25 is isolated from the upstream portion 25a and the brake fluid pressure in the brake caliper 26 can be varied independently of the pressure in the master cylinder 23. Moreover, when the valves 31 and 32 are closed, changes in fluid pressure in the master cylinder 23 will not affect the fluid pressure in the brake caliper 26. However, when the pressure in the master cylinder 23 becomes substantially less than the brake fluid pressure in the caliper 26, the valve 32 will automatically open so as to allow the brake fluid pressure in the caliper 26 to become substantially equalized with the pressure in the master cylinder 23 regardless of whether the solenoid valve 31 is in its opened or closed condition.

As previously mentioned, the brake caliper 26 is of the dual piston type and thus comprises a pair of oppositely disposed hydraulic wheel cylinders 26a. Disposed, for example, on an inside rear wall of each wheel cylinder is a (e.g. sealed) stack of piezoelectric discs 33. These discs 33 may comprise, for example, barium titanate, lithium niobate, PZT-4 (a Trademark of Clevite Corporation), or any other piezoelectric crystalline composition. Each disc in the stacks is electrically connected to a source of variable voltage by electrical lines 33a which penetrate into the wheel cylinder 26a in a sealed, fluid-tight manner. As is well known, piezoelectric discs are such that they expand (e.g. in their axial direction) when they are subjected to a voltage of one polarity and they contract (e.g. in their axial direction) when they are subjected to a voltage of the opposite polarity. Moreover, the degree of expansion and contraction of piezoelectric discs is more or less a linear function of the applied voltage. Consequently these stacks of piezoelectric discs 33 will expand and contract toward and away from the brake disc 29 as the magnitude of the electrical voltage to which they are subjected increases and decreases in the one polarity, respectively.

A variable inductance type speed sensor 34 of conventional construction is adhesively bonded to a circumferential edge of the caliper 26 at a position just radially outwardly of the ventilated brake disc 29. As is well known, the ventilated disc 29 comprises a plurality of radially directed, axially extending webs 29a which are disposed circumferentially around the disc 29 and which join together a pair of disc faces 29b. During wheel rotation, the speed sensor 34 (which may comprise an electrical coil at its tip) magnetically senses the movement of each web 29a as it passes and produces a signal indicative of wheel rotation speed. If necessary, a heat insulating and/or vibration dampening layer (such as rubber) may be employed between the speed sensor and the caliper 26 as part of the adhesive bonding process.

Also adhesively bonded to the brake caliper 26 is an inertial-type (e.g. variable capacitance) accelerometer 35 of conventional construction. (This accelerometer, which typically comprises a cantilevered inertial weight, may be actively controlled, via conventional means including a feedback circuit, to null any displacement thereof induced by acceleration. In such an arrangement, a signal from the feedback circuit is effectively utilized to indicate the acceleration force acting on the inertial weight.) The accelerometer 35 is preferably positioned horizontally on the caliper 26 in a plane 35a which extends to, or as close as possible to, the center of the contact patch of the tire with the road. The accelerometer 35 senses the uncorrected (as will be explained) instantaneous longitudinal deceleration of the vehicle (in the direction defined by the plane of wheel rotation) at a point which corresponds as closely as possible to the tire contact patch. Again, a heat insulating and/or vibration dampening layer 35b (such as rubber) may be employed between the accelerometer 35 and the caliper 26.

An inclinometer 36 of conventional construction is mounted at an appropriate location e.g. on the vehicle body or frame and produces a signal representative of the fore and aft inclination (i.e. pitch) of the vehicle to which the present invention is applied.

It is advantageous to equip the dashboard (or other suitable area) of the vehicle with a switch 37 and indicator means 38. The switch 37 is provided to selectively activate and deactivate the brake force control means 3. The indicator means 38 comprise e.g. an LED 38a indicating that the brake force control means 3 is ON, an LED 38b indicating that the brake force control means 3 is OFF, and an LED 38c indicating that there is a problem with the brake force control means 3. Moreover, the LED 38a may controlled so as to pulsate or strobe whenever the brake force control means 3 is effecting skid control on one or more of the vehicle wheels. In this manner, the indicator means 38 also provides an indication to the vehicle operator that the hydraulic pressure in at least one of the vehicle brakes is being controlled exclusively by the brake force control means 3, as will be described below.

Each of the elements 22, 31, and 33 to 38 is electrically connected to a controller 39 which may comprise one or more microprocessors 39a. The controller 39 is used to determine the existence of an incipient wheel skid condition due to the application of the vehicle brake pedal 20 and to control the operation of the brake force control means 3 responsive thereto.

The controller 39 receives a brake signal 22s from the brake pedal switch 22 (representative of a depressed or released condition of the brake pedal 20), a wheel speed signal 34s from the wheel speed sensor 34 (representative of the rotational speed of the vehicle wheel as sensed at the brake disc), an uncorrected vehicle deceleration signal 35s from the accelerometer 35 (representative of an uncorrected magnitude of longitudinal deceleration of the vehicle at the brake caliper), an inclinometer signal 36s from the inclinometer 36 (representative of the fore and aft inclination, or pitch, of the vehicle), and an activation signal 37s from the switch 37 (representative of an operator's desire that the brake force control means 3 be activated or deactivated).

Based on the received signals described above, the controller 39 produces appropriate output signals 31s, 33s, and 38s. The signal 31s is applied to the solenoid 31d and controls the position of the solenoid valve 31 to open or close two-way hydraulic communication between the upstream portion 25a of the brake line 25 and the downstream portion 25b thereof. The signal 33s is, for example, a variable voltage signal applied to the electrical lines 33a and controls the degree of expansion and contraction of the stacks of piezoelectric discs 33. Lastly, the signals 38s are applied to the indicator means 38 and control the illumination of the LEDs 38a, 38b, and 38c to advise the operator of the condition of the brake force control means 3.

According to the invention, one controller 39 may be located at an appropriate location in the vehicle and may effect control not only of the one illustrated brake force control means 3 leading to the illustrated caliper 26, but of any number of other brake force control means, as indicated schematically at 3a, which are applied to other brakes of the vehicle. In the preferred embodiment for an automobile, the anti-lock brake system 1 comprises four brake force control mechanisms (e.g. elements 31 to 35) which are interconnected so as to share a single inclinometer 36, switch 37, indicator means 38 and controller 39. Moreover, for each vehicle wheel brake to which a brake force control means is applied, it is advantageous to have all necessary electrical signals to or from the wheel brake (e.g. 33s, 34s, 35s, and 31s if desired) transmitted through protected electrical conductors which run on or within an outer covering of the flexible portion of the brake line 25, which flexible portion provides the hydraulic link between the sprung vehicle chassis and the unsprung wheel brake.

Although the brake force control means 3 has been shown in particular detail, various modifications may be made. For example, a slidable piston SP (shown in phantom lines in FIG. 2) may be provided in each wheel cylinder 26a so as to sealingly surround each piezoelectric disc stack 33, thereby protecting the piezoelectric disks from the (e.g. corrosive) effects of the brake fluid. If the speed sensor is positioned to sense the passing webs 29a of the ventilated disc 29, then it may be advantageous to surface treat (e.g. paint) or otherwise modify the webs in order to create, preserve, or enhance their magnetic properties. However, the speed sensor 34 need not be positioned to sense the passing webs 29a (e.g. because not all brakes comprise ventilated discs). Instead, a toothed magnetic wheel (or other equivalent means) may be provided at a suitable location on the rotatable brake element, wheel, or axle assembly and the wheel speed sensor 34 may be positioned so as to sense the passing teeth on the toothed wheel, thereby producing a signal indicative of the rotational speed of the wheel. Moreover, the speed sensor need not be a magnetic sensor, but may, for example, be an optical sensor or an accustical (e.g. vibration) sensor. The accelerometer 35 need not be positioned on the caliper 26, but could be mounted on the vehicle frame (e.g. at a central location) and the signal 35s from such an accelerometer could be utilized by more than one brake force control means 3. Moreover, the functions of the valves 31 and 32 may be performed by a single electromagnetic valve means which normally allows two way fluid communication in the brake line 25 and which is energizable to allow only one way fluid communication (i.e. toward the master cylinder 23).

The operation of the anti-lock brake system is as follows.

Figure 3A:
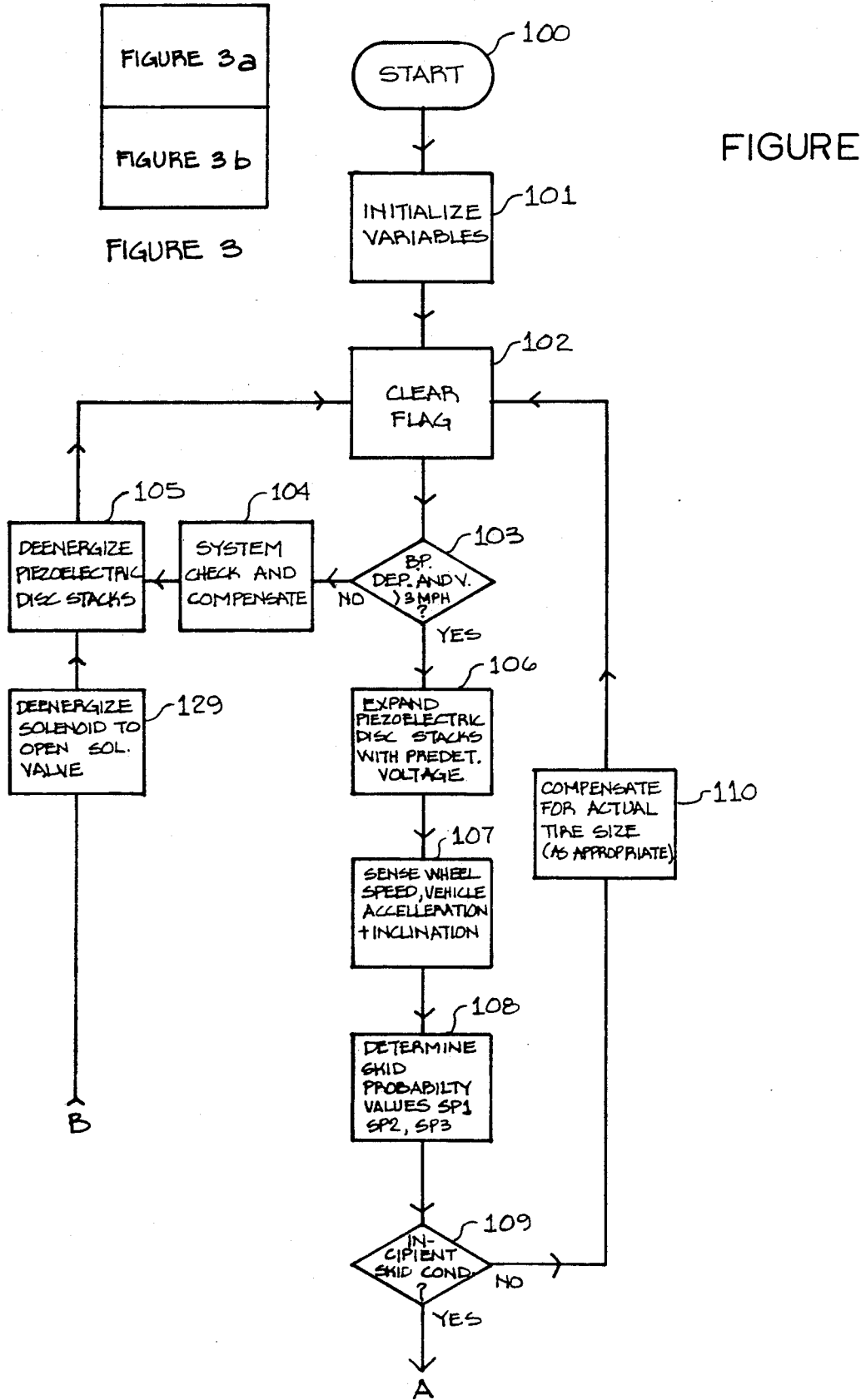
FIGS. 3a and 3b is a flow chart representing the control algorithm used by the system of FIG. 2 when it is determined that less than all of the brakable vehicle wheels are experiencing a skid controlled condition.
Figure 3B:
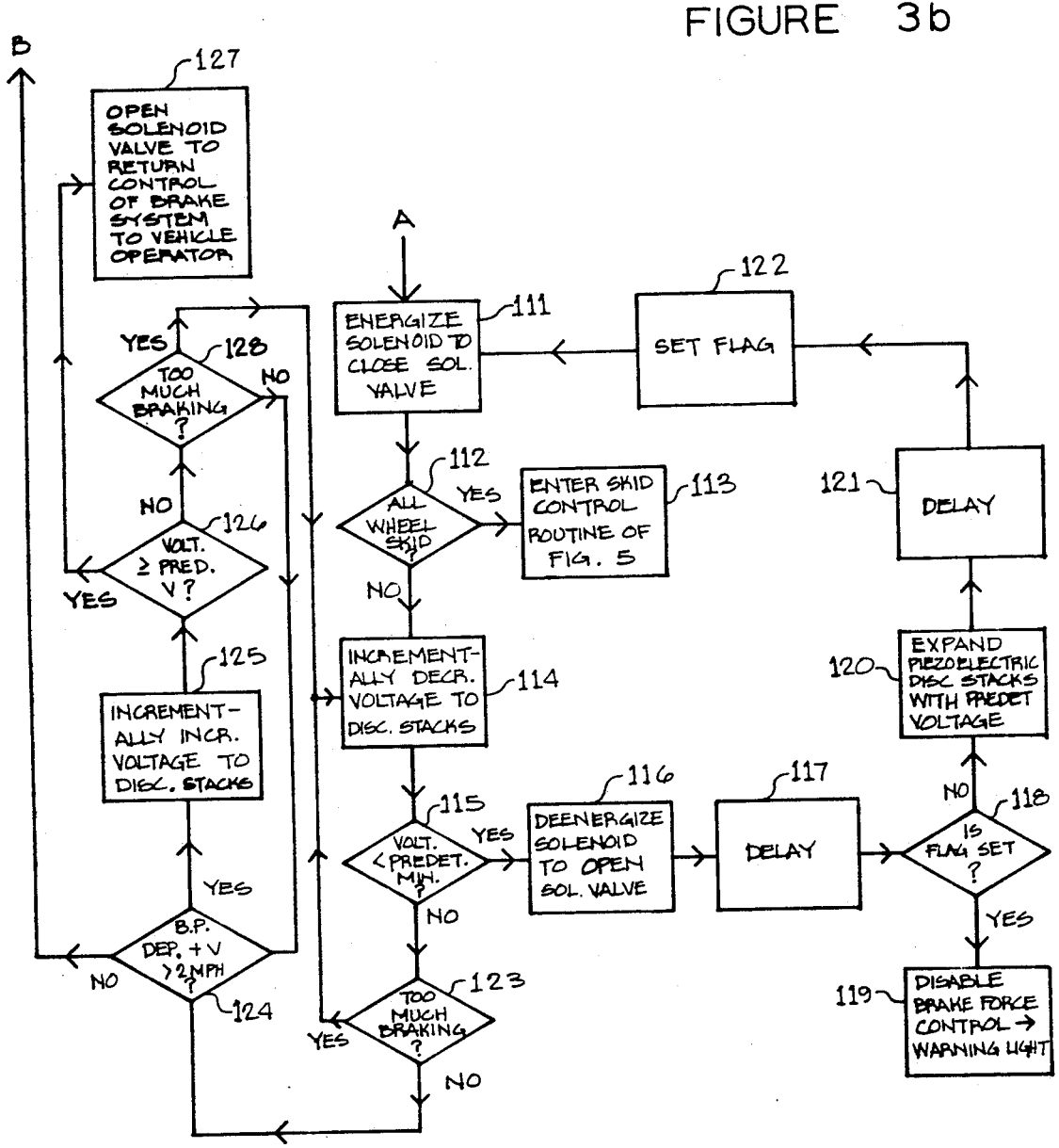

FIG. 3 reveals one example of a flow control diagram used in the controller 39 for effecting a brake force control on one wheel brake of a vehicle. The controller 39 uses similar flow control diagrams to effect brake force control on the other anti-lock equipped wheel brakes of the vehicle.

The flow control starts at step 100 when the vehicle ignition is on and the system switch 37 is on. At the next step 101, necessary variables (such as tire diameter, number of wheels, etc.) are initialized from memory. Flow continues to step 102 wherein a flag, used to determine a malfunction of the anti-lock brake system, is cleared. Next, in step 103, the controller 39 decides if the brake pedal is depressed (based on the signal 22s) while the vehicle speed (e.g. as determined by a vehicle speedometer or a wheel speed sensor) is greater than, for example, 3 m.p.h. If the answer to step 103 is NO, then the controller decides that a dangerous wheel skid is not imminent and enters a "system check" routine 104.

The system check routine 104 comprises fault detection and correction procedures carried out by the controller 39 for the components in the anti-lock brake system 1. Specifically, fault detection for the solenoid valve 31 is accomplished by measuring the inductance and/or impedance of the solenoid 31d when a low level a.c. test signal is applied thereto to thereby determine the position of the solenoid armature and thus the position of the solenoid valve. The test signal is not of sufficient magnitude to displace the valve 31 against the bias of the spring 31b, but it is sufficient to determine if the valve is stuck in an improper (e.g. closed) position. If a fault is determined, voltage to the solenoid 31d may be so controlled to attempt to unstick the valve 31, or the system warning light 38c on the dashboard may be energized.

Fault detection for the wheel speed sensor 34 is carried out by, for example, a comparison of the wheel speed signals 34s generated at each of the anti-lock brake equipped wheels of the vehicle. If, for example, one of the vehicle wheel speed sensors 34 generates a zero wheel speed signal while the rest of the wheel speed sensors are generating significantly higher wheel speed signals, then the controller determines that the one vehicle speed sensor is faulty, and energizes the system warning light on the dashboard. Moreover, the controller 39 compensates for such a fault by, for example, pairing the brake force control means on a wheel brake which has a faulty speed sensor with a brake force control means on a wheel brake which has an operative wheel speed sensor, and thereafter effecting simultaneous, non-independent control of the paired brake force control means on the two wheel brakes based on the wheel speed signal from the operative wheel speed sensor.

Fault detection for the accelerometer 35 is carried out, for example, in a similar manner as described above in conjunction with the wheel speed sensor 34. That is, a comparison is made between the deceleration signals 35s from the various accelerometers on the anti-lock equipped wheel brakes. If, for example, one of the accelerometers produces a zero (acceleration or) deceleration signal while the others produce significantly higher signals, the controller 39 determines that the one accelerometer is faulty and energizes the system warning light 38c. The brake force control means on the wheel brake with the faulty accelerometer is then paired with a brake force control means on a wheel brake having an operative accelerometer and individual control of each one of the paired brake force control means is effected based on the deceleration signal from the one operative accelerometer.

Various other system check procedures may be effected at step 104 to determine the operational state of, for example, the inclinometer 36, the brake pedal switch 22, the microprocessor 39, etc. as may be desired. Moreover, diagnostic port means may be provided for outputting the diagnosis of a particular fault to a serviceman.

Flow then continues to step 105, wherein the piezoelectric disc stacks 33 are returned to or maintained in a deenergized condition. That is, at step 105, the voltage applied to the piezoelectric disc stacks 33 equals zero. The program then returns to step 102.

If the answer to the question in step 103 is YES, then the controller proceeds immediately to step 106, wherein the piezoelectric disc stacks 33 are expanded or maintained in an expanded condition by the application of an initial predetermined voltage V (e.g. +12 volts). That is, at step 106, the voltage applied to the piezoelectric disc stacks equals the initial predetermined voltage V. (At this point, since the brake fluid reservoir 24 has not yet been cut off from hydraulic communication with the master cylinder, any excess brake fluid which is displaced from the wheel cylinders 26a due to the expansion of the piezoelectric disc stacks 33 may flow, with minimal resistance, to the reservoir 24 without causing any substantial application of the vehicle brakes. However, such an initial expansion of the piezoelectric disc stacks will decrease the response time between the depression of the brake pedal and the pressurization of the wheel cylinders.)

At the next step 107, the controller 39 determines the wheel speed, the vehicle longitudinal deceleration, and the vehicle inclination from the signals 34s, 35s, and 36s produced by sensors in the brake force control system. From this information and from the tire size stored in memory, the controller proceeds to derive three skid probability values, SP1, SP2, and SP3 at the step 108. Each of these skid probability values represent an independently determined probability from sensed vehicular conditions that the wheel to which the brake force control means 3 is applied is entering a skid condition. Although in the preferred embodiment, three skid probability values SP1, SP2, and SP3 are determined, the control routine for the brake force control means would work sufficiently well if only one or two of these values were determined. The exact manner in which these values are determined is more fully explained in conjunction with FIGS. 4a, 4b, and 4c.

Figure 4A:
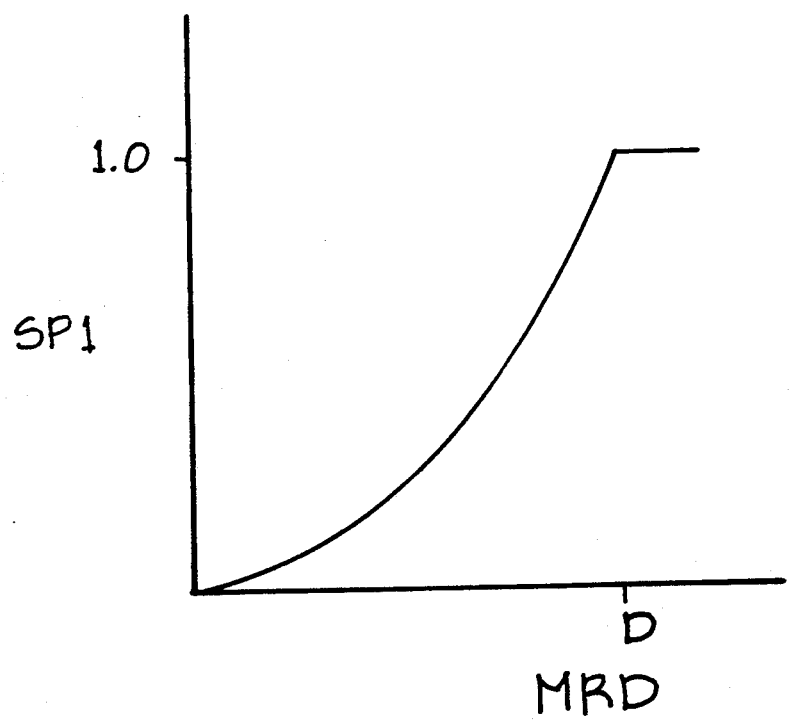
FIGS. 4a through 4g are diagrams which represent manners in which skid probability values are determined by the system of FIG. 2.

Referring briefly to FIG. 4a, there is shown a graph of the relationship between SP1 and the magnitude of rotational deceleration MRD of the wheel to which the brake force control means is applied. The MRD signal is calculated by the controller 39 as a mathematical time derivative of the wheel speed signal 34s. As shown in the Figure, the value of SP1 increases (for example) with the square of the MRD at such a rate that when the MRD is equal to a value D which would theoretically correspond to a vehicular longitudinal deceleration of 1.2 g (assuming no wheel slip and a tire diameter as stored in memory), the value of SP1 is equal to 1.0. That is to say, when the rotational speed of the wheel is slowing down at a rate which would cause the vehicle to decelerate at 1.2 g if there was no wheel slip, then the controller 39 determines that there is a 1.0 (e.g. total) probability that wheel skid is imminent based on SP1. On the other hand when the rotational speed of the wheel is slowing down at a rate which would cause the vehicle to slow down at 0.6 g if there was no wheel slip, then the controller 39 determines that there is a 0.25 (e.g. small) probability that wheel skid is imminent based on SP1.

Figure 4B:
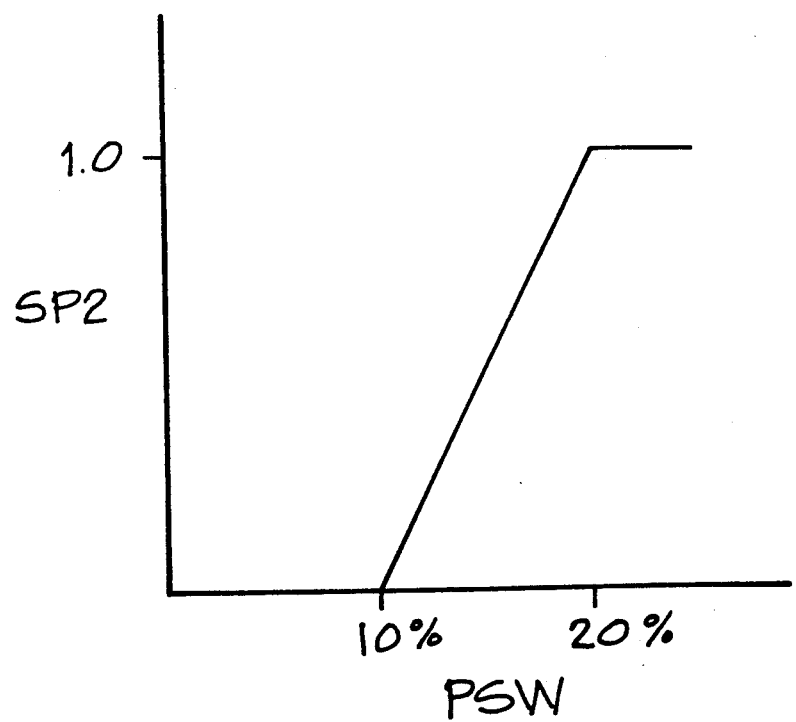

Referring to FIG. 4b, there is shown a relationship between SP2 and a computed value for the percent wheel slip PWS between the tire surface of the brake force controlled wheel and the road surface. As shown in the Figure, the value of SP2 is zero when PWS is less than 10%. Thereafter, SP2 increases linearly PWS such that, when PWS equals 20%, SP2 equals 1.0. When PWS is greater than 20%, SP2 is constant at 1.0.

The value for PWS is determined by the controller 39 as follows: Upon each initial brake pedal depression (when the vehicle speed is greater than 3 m.p.h.), the controller 39 obtains (at step 107) the wheel speed signal 34s from the sensor 34 and determines the wheel speed WSI of the wheel at the instant when the brake pedal was depressed. From the value of WSI and the tire diameter, the controller 39 computes the vehicle speed VSI at the instant of brake pedal depression. The controller 39 then, throughout the condition of brake pedal depression, continually integrates with respect to time the actual magnitude of longitudinal vehicle deceleration (at the wheel to which the brake force means is applied) and subtracts the integrated longitudinal vehicle deceleration from the initial vehicle speed VSI to continually obtain the actual longitudinal vehicular speed VSA. To obtain the actual magnitude of longitudinal vehicular deceleration referred to above, the uncompensated longitudinal vehicular deceleration signal 35s from the accelerometer 35 on the wheel caliper 26 is continually modified in order to compensate for any effects of gravity due to a fore and aft inclination of the vehicle as represented by the signal 36s from the inclinometer. That is, the uncompensated longitudinal vehicular deceleration is multiplied by the quantity one minus the sine of the current sensed angle of fore and aft inclination, wherein the angle is given a positive value on a downward slope and a negative value on an upward slope, as defined relative to the direction of vehicle travel. (Alternately, as a modification, the actual longitudinal vehicular speed VSA may be obtained directly from a conventional longitudinal vehicle speed sensor, shown in phantom lines in FIG. 2 at S, which employs, for example, sonar to determine the travelling speed of the vehicle relative to the road surface.) Also throughout the condition of brake pedal depression, the controller 39 continually obtains the signal 34s from the wheel speed sensor 34 to monitor the current wheel speed WSC. From the value of WSC and the tire diameter, the controller 39 continually computes the current longitudinal tire speed TSCL (e.g. the speed in distance per unit time that a first point on the rotating perimeter of the tire would move away from a second point which was instantaneously coextensive with the first point but fixed against any movement relative to the axis of the tire, as approximately defined by the product of the r.p.m. of the tire, the diameter of the tire, and pi). The controller 39 then continually subtracts the current longitudinal tire speed TSCL from the actual vehicle speed VSA to obtain a tire slip speed TSS, which is the speed (in distance per unit time) at which the tire surface is slipping on the road surface. Finally, the controller 39 determines the percent wheel slip PWS by dividing the tire slip speed TSS by the actual vehicle speed VSA and multiplying by 100.

Referring to FIGS. 4c to 4g, there is shown a series of five graphs theoretically representing i. hydraulic braking force vs. time; ii. rotational wheel deceleration vs. time; iii. the rotational wheel deceleration vs. hydraulic braking force; iv. the derivative of the rotational wheel deceleration with respect to the hydraulic braking force (hereinafter called "beta") vs. time; and v. SP3 vs. the magnitude of beta, all during the onset of a wheel skid condition.

Figure 4C:
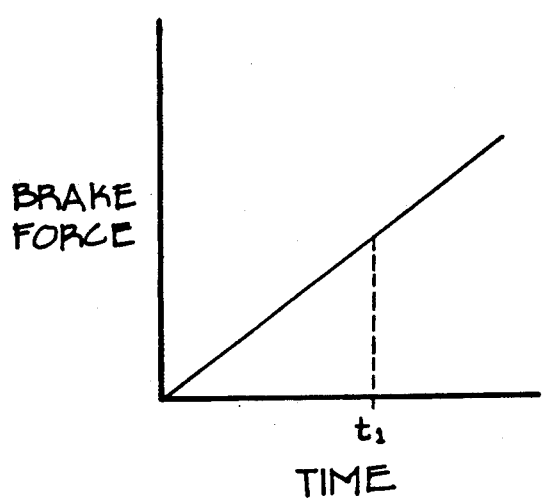

In FIG. 4c, there is shown a typical graph of the braking force developed in a brake caliper of a vehicle versus time during a severe braking action called for by the vehicle operator. Because of the limits in adhesion between the road surface and the tire, the vehicle enters a skid at a time t1.

Figure 4D:
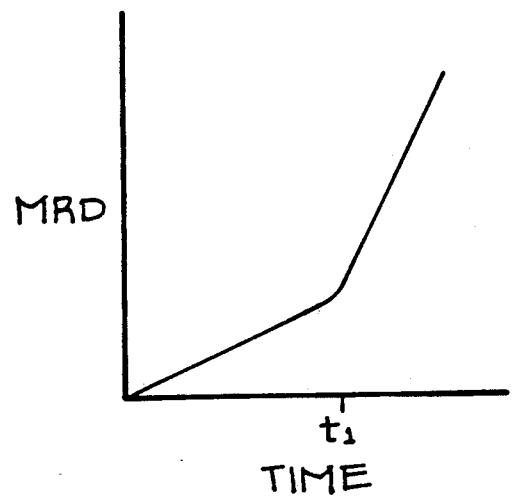

In FIG. 4d, there is shown a graph of the magnitude of rotational deceleration MRD of the braked wheel versus time for the vehicle of FIG. 4c. Before the time t1, the slope (or rate) of the wheel deceleration is less than the slope (or rate) of the wheel deceleration after the time t1. This phenomenon can be explained by an work/energy analysis of the vehicle system during a transition from rolling braking to skidding braking.

Before the time t1, the increases in the amount of energy (e.g. heat) dissipated at the vehicle brakes as the braking force increases comes from two primary related (e.g. physically coupled) sources: the kinetic energy of the vehicle as a whole produced by its linear velocity and the rotational kinetic energy of the vehicle wheels produced by their angular velocities. Therefore, each increase in braking force would cause a corresponding increase in the rate of energy dissipation at the brakes which, in turn, would cause both the linear kinetic energy of the vehicle and the rotational kinetic energy of the wheels to be reduced simultaneously. That is, only part of the increased energy dissipation at the vehicle brakes would cause an increase in the angular deceleration of the vehicle wheels.

After the time t1, the increases in the amount of energy dissipated at the vehicle brakes as the braking force increases can only come from one primary source: the rotational kinetic energy of the vehicle wheels. This is because the entire available frictional force (i.e. load) between the vehicle and the road surface is already being developed and cannot be increased. Therefore, after the time t1, the entirety of every increase in energy dissipated at the vehicle brakes must come from the rotational kinetic energy, of the vehicle wheels. Consequently, although the braking force in FIG. 4c increases linearly before and after the time t1, there is a detectable change in the rate of angular deceleration at the point t1.

Figure 4E:
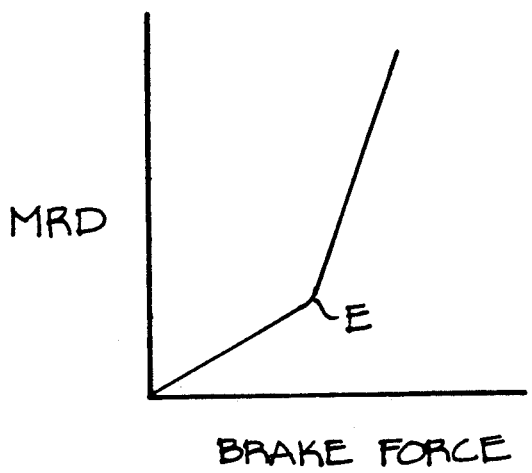

In FIG. 4e, there is shown a function representing the magnitude of rotational deceleration of the wheel as a function of the hydraulic braking force for the vehicle in FIG. 4c. (The hydraulic braking force is determined as the product of the hydraulic pressure in the wheel cylinder multiplied by the area of the caliper piston(s).) There is a distinct change in the slope of this function at the point E which is caused by the onset of the skid condition and corresponds to the time t1 in FIG. 4d. The slope (or derivative) of this function is defined as "beta".

Figure 4F:
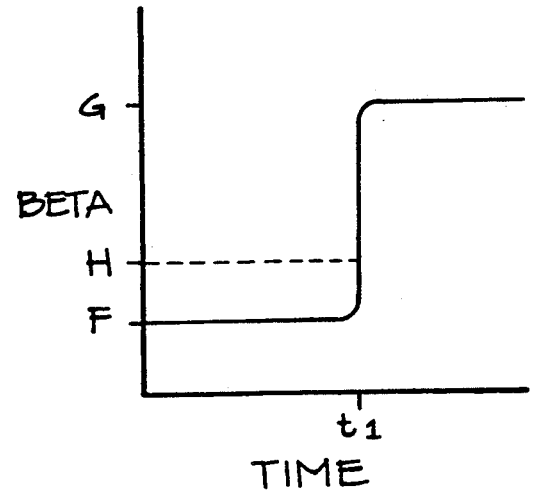

Beta is plotted in FIG. 4f as a function of time. As seen in the graph, before the time t1, beta has a relatively low, relatively constant value F (generally around $2(10)^{-3} N^{-1} s^{-2}$ for a passenger car) which may be determined either experimentally or empirically as a function of the mass of the vehicle, the radius of the tire, the moment of inertia of the tire and wheel, the coefficient of friction of the brake pad on the brake disc, and the effective braking radius of the caliper on the brake disc. After the time t1, however, beta increases dramatically to a relatively high value G (generally around $6(10)^{-2} N^{-1} s^{-2}$ for a passenger car) which may be 30 times higher than the value F and is an empirical function of the coefficient of friction of the brake pad on the brake disc, the effective braking radius of the caliper on the brake disc, and the moment of inertia of the tire and wheel.

Figure 4G:
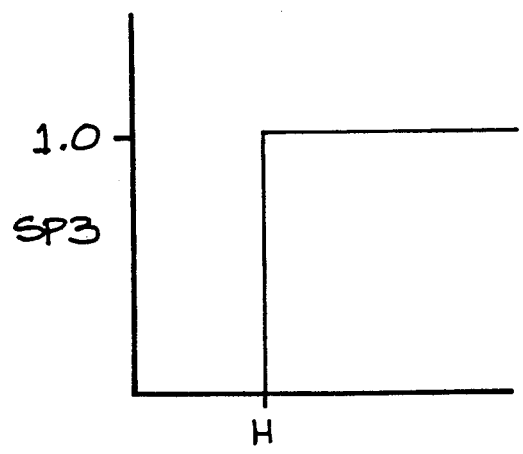

The value of SP3 is either zero or one, as shown in the FIG. 4g. That is, SP3 is normally zero. However, when beta equals or exceeds a predetermined value H (which is larger than the low value F but smaller than the high value G, e.g. $6(10)^{-3} N^{-1} s^{-2}$) the value of SP3 becomes 1. In this manner, the controller 39 determines e.g. the total probability that the wheel 4 has entered a skid condition.

According to the present invention, the hydraulic braking force and magnitude of rotational deceleration are determined using the piezoelectric disc stacks 33 and the wheel speed sensor 34 respectively. In particular, as the hydraulic pressure in the wheel cylinder 26a increases (but before skid control is initiated by a YES answer to the question in step 109), the piezoelectric discs will, as a consequence, be compressed. When these discs are compressed, they will produce a flow of electrical charge in the electrical lines which comprise the circuit between the voltage source in the controller 39 and the piezoelectric disc stacks 33. The magnitude of this flow of charge (measured, for example, as a voltage drop across a control resistor which is disposed in the circuit in series connection with the piezoelectric disc stacks 33; see FIG. 8) is indicative of the pressure in the wheel cylinder 26a. The pressure in the wheel cylinder is itself indicative of the hydraulic braking force. On the other hand, to provide pressure sensing means, it may be desireable to provide one or both of the piezoelectric disc stacks 33 with an extra piezoelectric disc which is not electrically connected to the voltage source, but which instead produces a voltage (upon compression)to be sensed by the controller 39, indicative of the hydraulic brake pressure. Alternately, the wheel cylinder 26a may be provided with a conventional pressure sensor (shown in phantom lines at PS in FIG. 2) distinct from the piezoelectric disc stacks 33 and electrically connected to the controller 39 to determine the hydraulic braking force.

After the determination of SP1, SP2, and SP3, flow continues to step 109 wherein these skid probability values are each individually compared to a predetermined value SPPV (for example, 1.0) to determine whether or not an incipient skid condition exists. Alternately, these skid probability values may be combined according to a mathematical relation (e.g. by addition), with the solution SPS to the mathematical relation being compared to the predetermined value SPPV to determine whether or not an incipient skid condition exists. If, for example SPS is less than SPPV, then it may be determined that an incipient skid condition does not exist, and program flow proceeds to step 110 before returning to step 102.

In step 110, when it has been determined that the wheel is not skidding, the controller 39 compares the rate of change of rotational wheel speed (as determined from the signal 34s) with the longitudinal (acceleration or) deceleration of the vehicle (as determined from the signal 35s) to determine the exact size (e.g. diameter) of the rolling wheel. The exact tire size is compared to the tire size initialized at step 101, and the initialized tire size is changed in the memory of the controller 39 when appropriate. In this manner, various tire sizes can be used on the vehicle the which the present invention is applied without adversely affecting the operation of the anti-lock brake system 1.

If an incipient skid condition does exist at step 109, the flow proceeds to step 111 wherein the controller 39 initiates skid control and energizes the solenoid 31d (via signal 31s) to close the solenoid valve 31. When the valve 31 is closed, further increases in the brake fluid pressure in the master cylinder 23 and the upstream portion 25a of the brake line 25 which are caused by further depression of the brake pedal 22 will no longer effect the brake fluid pressure in the wheel cylinders 26a. That is, the presence of the valves 31 and 32 in the brake line 25 will limit the maximum fluid pressure in the wheel cylinders 26a to the brake fluid pressure which existed in the wheel cylinders 26a at the time the solenoid valve 31 closed. This maximum fluid pressure in the wheel cylinder 26a is too high, however, because it has caused the development of an incipient skid condition.

The controller 39 must now initiate a reduction of the brake fluid pressure in the wheel cylinders 26a. Therefore, the control routine now proceeds to step 112 where it is determined whether or not all brakable vehicle wheels are presently experiencing skid control by the controller 39. If the answer to the question in step 112 is YES, then control routine proceeds to step 113, wherein a total skid control is effected by the controller 39. This total skid control will be more fully explained with reference to FIG. 5.

If the answer to the question in step 112 is NO, then control proceeds to step 114 wherein the predetermined voltage V supplied to the piezoelectric disc stacks 33 is incrementally decreased (although it is envisioned that the voltage may be gradually decreased as well). Decreasing the voltage V supplied to the piezoelectric disc stacks 33 will, in the presence of the closed valves 31 and 32, cause an increase in the total effective internal volume of the wheel cylinder 26a and the downstream portion 25b of the brake line 25 (e.g. due to the contraction of the stacks 33). Such an increase in the effective internal volume of the wheel cylinder 26a and the downstream portion 25b will in turn cause a decrease in the brake fluid pressure downstream of the valves 31, 32 (in as much as the amount of brake fluid downstream of the valves 31, 32 will remain substantially constant), with the extent of the decrease in the brake fluid pressure being determined mostly by the compressibility characteristics of the brake fluid and the brake pads 28 as well as the stiffness of the caliper 26.

Preferably, the magnitude of the incremental decrease in voltage in step 114 is initially decided based on one or more of the skid probability values SP1, SP2, and SP3. For example, the value of SP1 gives an indication of the coefficient of friction between the road surface and the tire, and the incremental decrease in voltage may be proportional to SP1. In this manner, when the road coefficient of friction is high and a skid has been initiated, the braking force at the wheel brake will be decreased quicker than when a skid has been initiated on a low coefficient of friction road surface. This compensates for the fact that a greater amount of excess brake pressure is required to be produced by a vehicle driver to initiate a skid on a dry road than on a slippery road. Furthermore, this allows for a finer control of the braking force on slippery roads. The initial value of the incremental decrease in voltage in step 114 may be between 1 mV and 1 V depending on the particular application and the mechanical response time of the vehicle brake system to changes in brake fluid pressure.

In the next step 115, the controller 39 determines whether or not the voltage currently being supplied to the piezoelectric disc stacks 33 is less than a predetermined minimum (such as zero volts or −12 volts). If the answer to this question is YES, flow proceeds to step 116 where the controller 39 enters fail-safe operation.

Entering step 116, when the voltage supplied to the piezoelectric disc stacks 33 is less than the minimum, the hydraulic pressure in the wheel cylinder can no longer be reduced by the controller 39. However, the controller 39 is still trying to effect skid control on the wheel brake. Normally, this condition will not occur because the size and expansion capabilities of the piezoelectric disc stacks 33 are chosen such that when the piezoelectric disc stacks occupy their minimum volume (e.g. when they are fully contracted) the brake pressure in the wheel cylinders 26a will be at zero pressure, regardless of the amount of pressure that was in the wheel cylinders 26a when the skid was initiated. However, if one of the valves 31 or 32 is stuck partially open or leaking, or if the piezoelectric disc stacks 33 are not functioning properly, the condition leading to step 116 may occur.

At step 116, the controller deenergizes the solenoid 31d to open valve 31, thereby reestablishing communication between the upstream and downstream portions 25a and 25b of the brake line 25. A delay is then effected at step 117 to allow a steady state condition to develop in the brake line 25. Next, in step 118, the controller 39 determines whether or not the flag is set. If the flag is set, flow continues to step 119 where the brake force control means 3 is disabled and the warning light 38c is energized. After step 119, the vehicle driver is given full control of the hydraulic pressure in the vehicle brake, and the controller 39 will make no attempt to operate the brake force control means 3 for that vehicle brake until a corrective action is taken.

If the flag in step 118 is not set, then flow proceeds to step 120 wherein the piezoelectric disc stacks 33 are expanded by the application of a predetermined voltage from the controller 39. After an appropriate delay 121, the flag is set in step 122, and the program flow returns to step 111 in another attempt to effect proper skid control.

If the answer to the question in step 115 is NO, then the controller 39 proceeds to decision step 123. In step 123 the controller 39 decides whether or not too much braking force is being applied to the disc 29 at the caliper 26. The controller 39 may, for example, monitor either the percent wheel slip PWS (as calculated above) or the magnitude of beta (as calculated above) to determine whether the braking force being applied to the disc 29 is too high or not. For example, when the monitored percent wheel slip PWS exceeds a predetermined target level (e.g. 15 to 20 percent), the braking force is determined to be too high. (In a modification, the target value for PWS may be determined as the value of PWS which existed just prior to the last change of SP3 from 0 to 1.) Alternately, if beta exceeds a predetermined target value (such as F in the graph iv. of FIG. 4c), thereby indicating the onset or existence of a skid, then the braking force is determined to be too high. If the answer to the question in step 123 is YES, then flow is returned to step 114, wherein the voltage V applied to the piezoelectric disc stacks 33 is further incrementally decreased to further reduce the hydraulic pressure in the wheel cylinder 26a. If, on the other hand, the monitored percent wheel slip PWS or beta value is at or below the target level, then the program flow proceeds to step 124.

At step 124, the controller 39 determines whether the brake pedal is still depressed AND the vehicle speed is greater than, for example, 2 m.p.h. If both of these conditions exist (i.e. if the answer to the question in step 124 is YES), then flow proceeds to step 125. If, however, either or both of these conditions no longer exist, then program flow proceeds sequentially through step 129 (where the solenoid 31d is deenergized) and step 105 (where the piezoelectric disc stacks 33 are deenergized) and arrives again at step 102 to signify an end to brake force control. Control of the braking force is returned to the vehicle operator.

Referring to the step 125 mentioned above, the controller 39 here incrementally (or gradually) increases the voltage V to the piezoelectric disc stacks 33 because it has previously been determined (in the step 123) that there is not too much braking. The initial incremental increase in voltage which occurs at step 125 is, for example, equal in magnitude to the initial incremental decrease in voltage which occurred in step 114.

Flow proceeds from step 125 to step 126 where the controller 39 checks to see whether the voltage V currently being supplied to the piezoelectric disc stacks 33 has reached (e.g. is greater than or equal to) a predetermined voltage (e.g. the initial predetermined voltage V applied to the piezoelectric disc stacks in step 106). If the answer to the question is step 126 is YES, the controller 39 infers (i.e. determines) that the possibility of a dangerous skid condition no longer exists, and flow then proceeds to step 127 wherein the solenoid 31d is deenergized to reestablish hydraulic communication between the upstream portion 25a and the downstream portion 25b of the brake line 25, thereby returning control of the vehicle brake system 2 to the vehicle operator.

If the answer to the question in step 126 is NO, then flow proceeds to step 128, wherein the controller 39 again determines whether or not too much braking force is being applied to the disc 29 at the caliper 26 in the manner described above with reference to step 123 (except that, if beta is being used, the predetermined target value in this step is set equal to e.g. the value H shown in graph iv of FIG. 4c). If the answer to the question in step 128 is YES, then the program flow proceeds to step 114. If the answer to the question in step 128 is no, then the program flow proceeds to step 124.

In establishing the optimum brake fluid pressure during a brake force control routine, the controller 39 must perform a brake pressure "homing" function as quickly as possible and also prevent brake pressure "hunting" once the homing function has occurred.

The brake pressure homing function is defined as initially finding the maximum brake fluid pressure which does not produce too much braking as defined with respect to step 123 above. To perform the homing function as quickly as possible, it is advantageous to initially set the magnitude of the incremental decrease in voltage in step 114 equal to a relatively large value e.g. 100 mV. (The magnitude of the incremental increase in voltage in step 125 may be the same as the magnitude of the incremental decrease in the step 114.)

However, once the homing function has occurred (as evidenced by a NO answer to step 123), such large incremental changes in voltage might give rise to "hunting" problems (which can be defined as repeatedly overshooting and undershooting what would be the optimum brake pressure by significant amounts and never quite being able to reach it). Evidence of hunting can be ascertained from e.g. a YES answer to the question in step 128 immediately following a NO answer in step 123 or a NO answer in step 123 immediately following a YES answer in step 128. ("Immediately" as used in this context signifies a chronological relationship between the two respective answers requiring that no other answer to either of the steps 123 or 128 occurs chronologically between them.)

Therefore, in order to reduce hunting, it will be advantageous to reduce the magnitudes of the incremental changes in voltage (set initially at steps 114 and 125) by, for example, fifty percent of their current values for every YES answer in step 128 which immediately follows a NO answer in step 123 and for every NO answer in step 123 which immediately follows a YES answer in the step 128.

To allow the controller 39 to "rehome" as necessary (for example, when the road surface condition changes and a new brake fluid pressure becomes necessary in the caliper 26) it will be advantageous to increase the magnitudes of the incremental changes in voltage by, for example, fifty percent (or more) of their current values (though never exceeding their initial values) for every NO answer in step 128 which immediately follows another NO answer in step 128 and for every YES answer in step 123 which immediately follows another YES answer in step 123.

Figure 5:
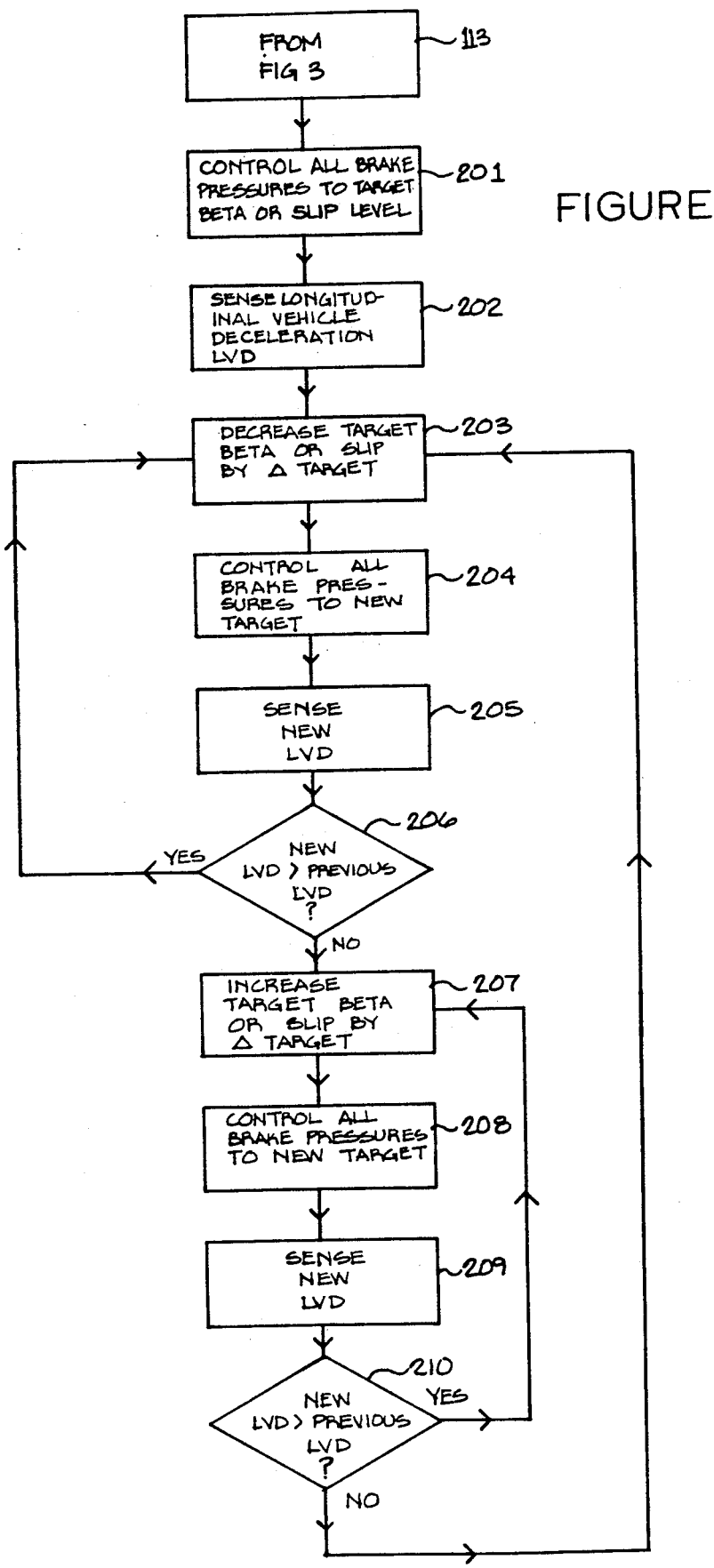
FIG. 5 is a flow chart representing the control algorithm used by the system of FIG. 2 when it is determined that all of the brakable vehicle wheels are experiencing a skid controlled condition.

Referring now to FIG. 5, wherein a control algorithm for the controller 39 is shown for effecting brake force control when all of the brakable vehicle wheels are determined to be undergoing a skid control operation.

Program flow proceeds from step 113 in FIG. 3 to step 201 in FIG. 5. In step 201, the controller 39 effects control of all the hydraulic brake pressures so as to produce the predetermined target level of the percent wheel slip PWS or the magnitude of beta in each one of the skid controlled vehicle brakes. For example, if the predetermined target level for wheel slip is 20%, then the controller 39 effects control of the brake pressure in each skid controlled brake (in the manner described with respect to FIG. 3) so as to establish and maintain 20% slip at each of the braked wheels.

Once step 201 has been accomplished (which may take a fraction of a second), flow proceeds to step 202 where the present longitudinal vehicle deceleration LVD is determined. The LVD may be determined from one of the accelerometers 35 provided on the vehicle, or it may be determined as the average of all the vehicle deceleration signals 35s.

Flow proceeds from step 202 to step 203 wherein the present target level is incrementally decreased by a small amount (for example 1% slip or $2(10)^{-4} N^{-1} s^{-2}$, respectively) to produce a new target level.

Next, in step 204, the controller 39 controls all the brake pressures to the new target level, after which flow proceeds to step 205 wherein a new longitudinal vehicle deceleration LVD is determined in the same manner as described above.

Flow continues to step 206 wherein the controller 39 determines whether the new LVD is greater in magnitude than the previous one. If the answer to the question in step 206 is YES, then program flow proceeds back to step 203. The purpose of returning to step 203 is to permit the controller 39 to further reduce the present target level to determine if further increases in the LVD can thus be achieved.

If the answer in step 206 is NO, then flow proceeds to step 207, wherein the present target level is incrementally increased by a small amount (e.g. as described above) to produce a new target level.

Proceeding to step 208, the controller 39 controls all brake pressures to the new target level, and thereafter in step 209 a new longitudinal vehicle deceleration LVD is determined.

Flow proceeds next to step 210, where the controller 39 determines whether the newly determined LVD is greater than the previously determined one. If the answer to the question in step 210 is YES, then program flow proceeds back to step 207. The purpose of returning to step 207 is to permit the controller 39 to further increase the present target level to determine if further increases in the LVD can thus be achieved.

Thus, the controller 39 determines the percent wheel slip value or the beta value will produce the maximum vehicle deceleration possible during a particular skid control operation, and uses the determined value as the target level for control routine. (For example, on newly fallen snow or on sand, the controller may determine that a locked wheel condition, e.g. skid, will produce the maximum deceleration.)

In order to decrease "hunting" for the optimum target level, it is advantageous to decrease the magnitude of the incremental changes in target level by, for example, fifty percent for each time that a NO answer in step 206 immediately precedes a YES answer in step 210 that is immediately followed by a NO answer in step 210 and for each time that a NO answer in step 210 immediately precedes a YES answer in step 206 that is immediately followed by a NO answer in step 206. ("Immediately" as used in this context signifies a chronological relationship between the respective answers requiring that no other answer to the steps 206 or 210 occurs chronologically between them.)

Similarly, it is advantageous to increase the magnitude of the incremental changes in target level by, for example, fifty percent (or more) for each time that a YES answer in step 206 immediately follows a YES answer in step 206 and for each time that a YES answer in step 210 immediately follows a YES answer in step 210.

Throughout the control routine of FIG. 5, the controller 39 continually monitors the vehicle speed (e.g. determined from a wheel speed signal), the condition of the brake pedal 20, and the voltages supplied to the piezoelectric disc stacks 33 in each of the brake force controlled calipers 26. If the vehicle speed falls below 2 m.p.h. or if the brake pedal 20 is released by the vehicle operator (as at step 124), brake force control is immediately terminated by deenergizing the solenoid valves 31 (as at step 126) and the piezoelectric disc stacks 33 (as at step 105). Alternately, if the voltage supplied to the piezoelectric disc stacks 33 in one or more of the brake force controlled calipers 26 equals or exceeds e.g. the initial predetermined voltage which was applied in step 106, then the control routine of FIG. 5 is terminated and individual brake force control of each of the anti-lock equipped wheel brakes resumes at step 126 of FIG. 3.

Preferably, the speed at which the controller 39 performs the control algorithms as represented in FIGS. 3 and 5 is selected to correspond to the mechanical response time of the brake force control means. For example, there is a certain "time lag" in the present brake system which is defined as the small delay which occurs between, for example, an increase in voltage applied to the piezoelectric disc stacks and the corresponding increase in braking force developed between the brake pads and the brake disc. One effective technique for determining an acceptable performing speed for the controller 39 is to stipulate that the minimum amount of time between successive changes in voltage applied to the piezoelectric disc stacks 33 must be e.g. twice the time lag of the brake system to which the brake force control means is applied. For the embodiment of FIG. 2, the controller 39 may be acceptably programmed so as to modulate the voltage applied to the piezoelectric disc stacks 33 at a rates of 40 to 100 or more times per second.

Figure 6:
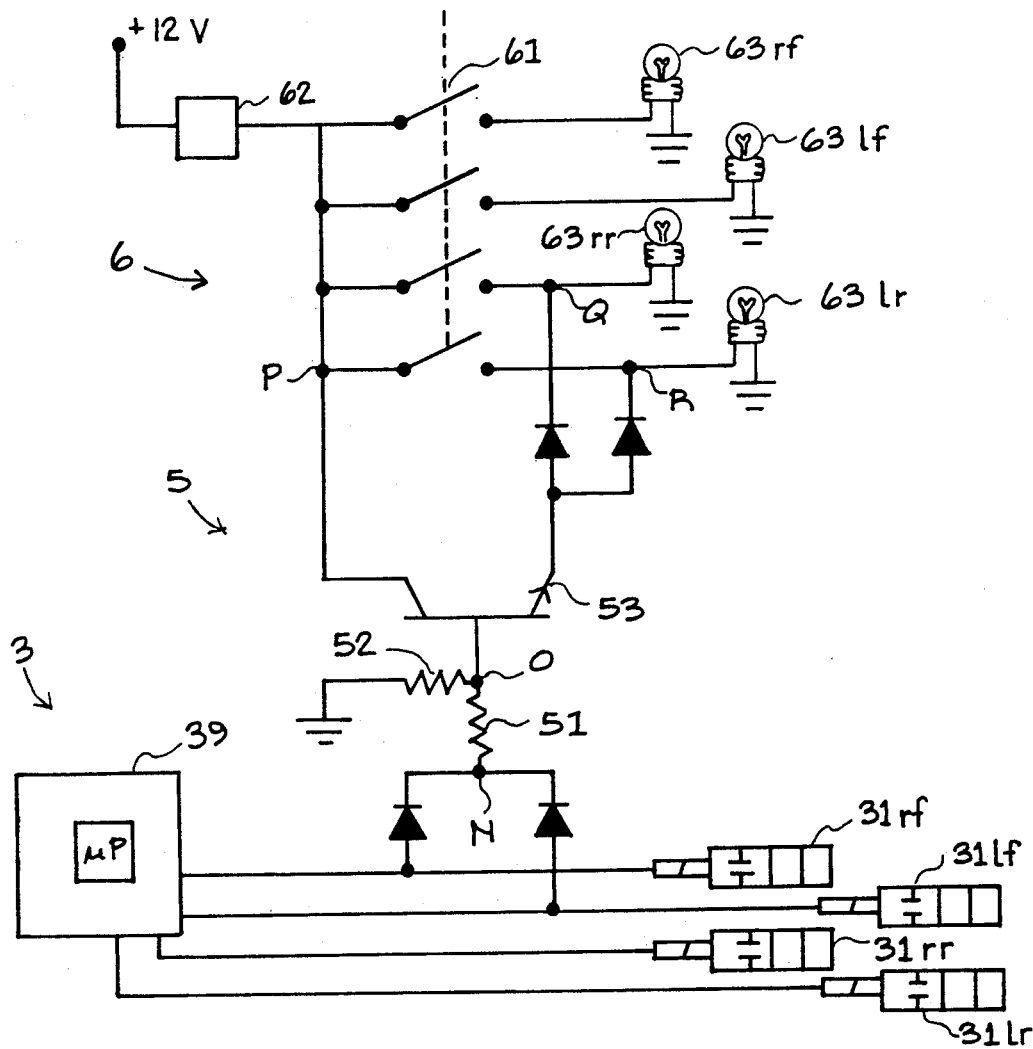
FIG. 6 is a detailed diagram showing the interaction of the anti-lock brake system with the control system for the vehicle tail-light assembly according to the present invention.

FIG. 6 reveals a tail-light control system 5 which is advantageously integrated with the brake force control means 3 of the anti-lock brake system and a hazard light control system 6 according to the present invention. Specifically, the conventional hazard light control system 6 comprises a conventional "hazard" switch 61 provided in series between a conventional flasher unit 62 and a set of four yellow flasher lamps 63rf, 63lf, 63rr, and 63lr which are provided at the right front, left front, right rear, and left rear portions of the vehicle, respectively.

As is conventional, an input to the flasher unit is provided with a 12 volt potential. As the hazard switch 61 is closed, an output current begins to flow from the flasher unit 62 to ground through the respective lamps 63. The flasher unit 62, however, controls the flow of current so as to be intermittent. In this manner, all the lamps 63 are controlled to flash simultaneously and repeatedly until the switch 61 is opened.

According to the invention, means are provided for flashing the rear two yellow flasher lamps 63rr, 63lr responsive to the operation of the brake force control means 3. As shown in FIG. 6, the brake force control means 3 is provided with four solenoid valves 31rf, 31lf, 31rr, and 31lr which are selectively energized with a predetermined voltage (as described above) when brake force control is initiated by the controller 39 at one or more of the vehicle wheels. When brake force control is initiated at one or both of the two front vehicle wheels, the respective solenoid valve 31rf and/cr 31lf is energized. This produces a high voltage at the node N. The high voltage is divided between the resistors 51 and 52 so as to produce a predetermined voltage (e.g. 5 volts) at the node O sufficient to turn the power transistor 53 conducting, thereby establishing electrical connectivity between the node P and the nodes Q, R. Once electrical connectivity has been established, the output of the flasher unit 62 will cause the rear flasher lamps 63rr, 63lr to flash simultaneously and repeatedly until both of the solenoid valves 31rf, 31lf are deenergized. In this manner, operators of closely following vehicles will be automatically warned when the brake force control means 3 is actuated.

Figure 6A:
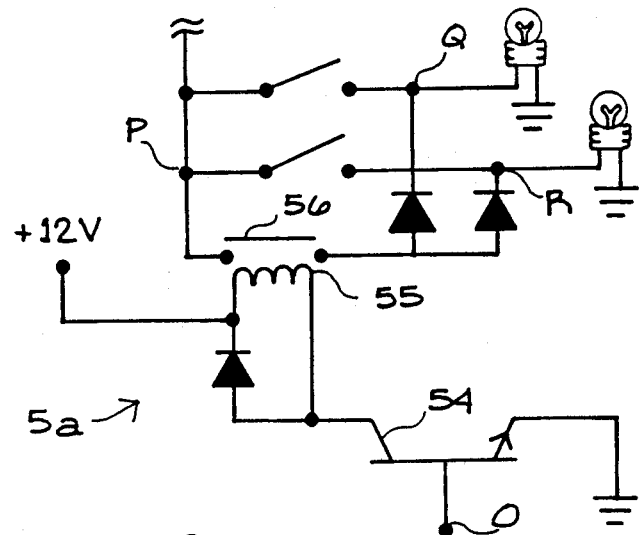
FIG. 6a is a modification of the diagram shown in FIG. 6.

In a modification shown in FIG. 6a, the power transistor 53 is replaced with a transistor 54 which is operative to drive a solenoid 55 to close a switch 56 when the predetermined voltage is applied at the node O. The tail-light control means 5a of this Figure performs the same function as described above with reference to FIG. 6.

Figure 7A:
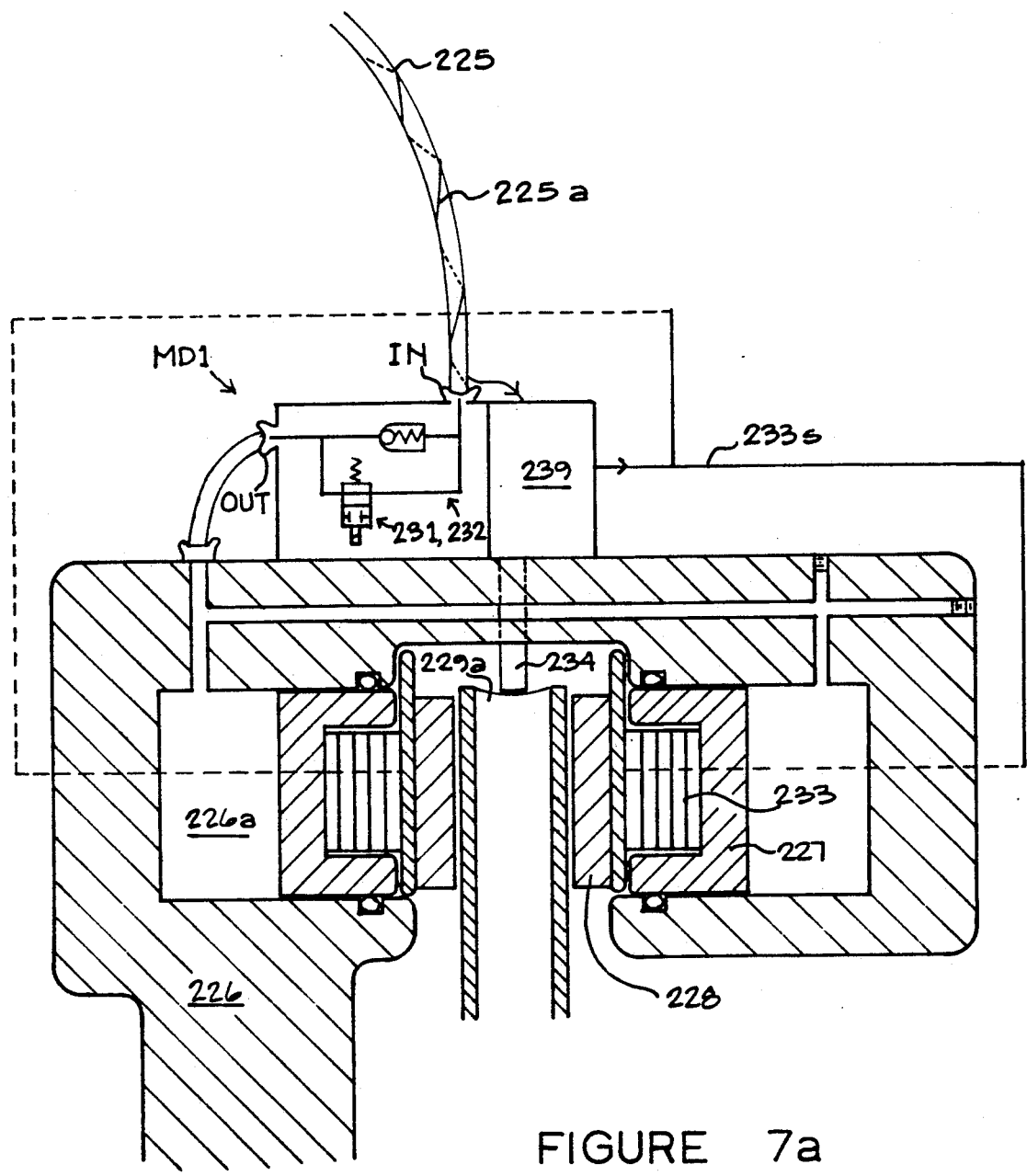
FIGS. 7a and 7b reveal an alternate embodiments of the anti-lock brake system according to the present invention suitable for after-market applications.
Figure 7B:
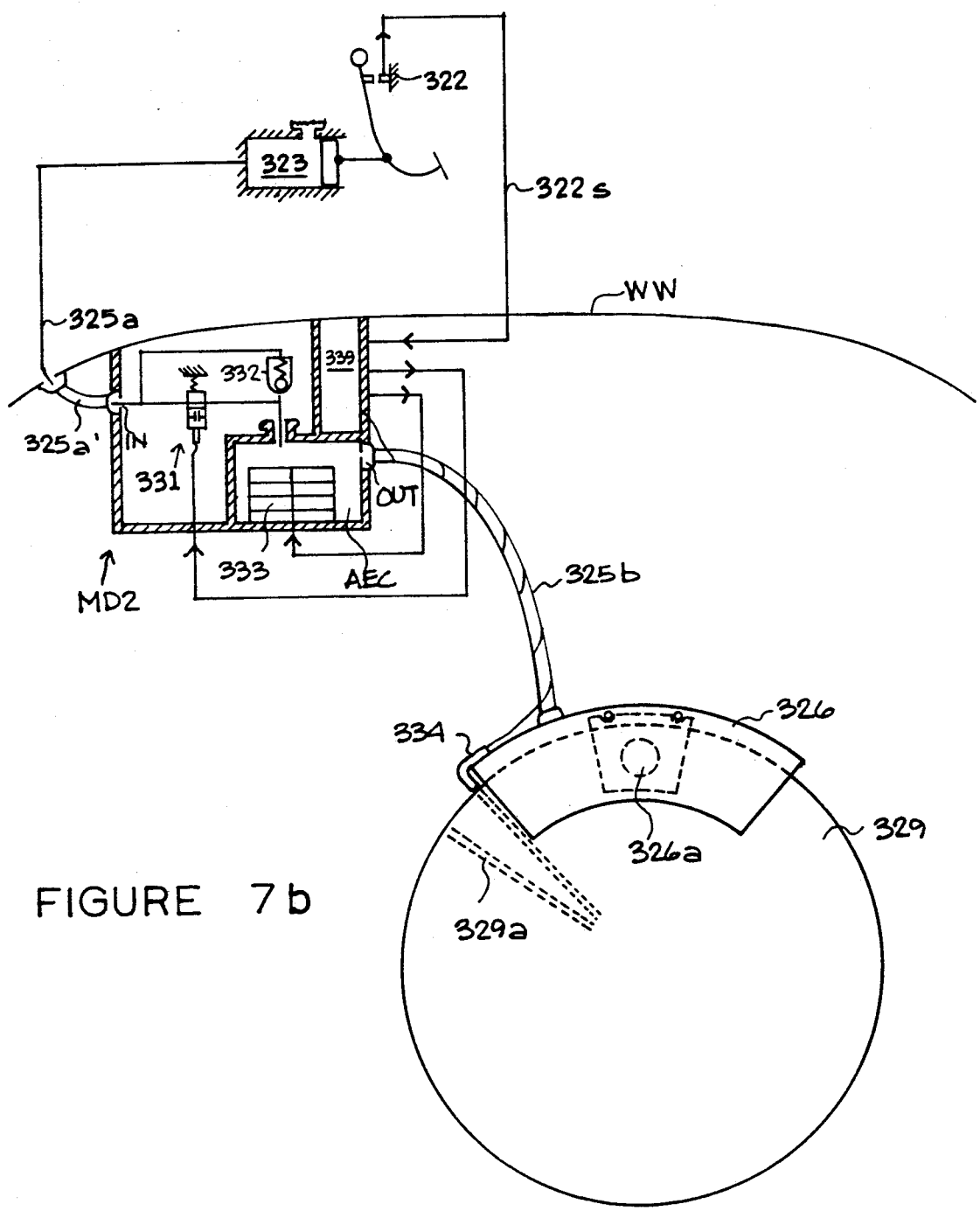

FIGS. 7a and 7b reveal preferred "after-market" applications of the anti-lock brake system according to the present invention.

In FIG. 7a, a stack of piezoelectric discs 233 is positioned adjacent each piston 227 in the dual piston caliper 226 and a new brake pad 228 is provided over each of the piezoelectric disc stacks in such a manner that each stack of piezoelectric discs 233 is sandwiched between a brake pad and a piston. Because the brake pads 228 can become extremely hot during braking, it is advantageous in this embodiment to employ lithium niobate as the piezoelectric material because of its high Curie point (T > 1200 degrees F.). A minimal clearance is left between each brake pad and its actuating piston to allow the piezoelectric disc stack to expand and contract effectively (while preventing the piezoelectric disc stacks from being exposed to too great of a compressive force). Moreover, an undercut may be provided, e.g. in the edge of the piston, for accommodating the electrical wires for the disc stacks.

A module MDI is adhesively (or otherwise) bonded to the caliper 226. (A heat insulating and/or vibration dampening layer may be employed in this process.) The module comprises a brake fluid inlet opening IN which is connected to a flexible brake line 225 in communication with a conventional master cylinder and a brake fluid outlet opening OUT connected to a brake fluid inlet of the caliper 226 e.g. via a short, flexible hydraulic line. The module further comprises valve means 231, 232 disposed hydraulically between the brake fluid inlet and outlet openings. The arrangement and function of the valve means 231, 232 is identical to that of the valves 31, 32, respectively, in FIG. 2.

The module MDI further comprises a controller 239 for controlling the valve means 231 (through a signal line, not shown) and the stacks of piezoelectric discs 233 (through signal lines 233s). The controller receives a signal from the vehicle brake pedal switch (not shown) and electrical supply power from a power supply line 225a which is disposed on or within an outer covering of the flexible brake line 225 and is electrically connected e.g. to the vehicle battery.

The controller 239 is electrically connected to a speed sensor 234 which is secured to the caliper 226 and extends to a position closely adjacent the webs 229a of the brake disc. In order to accurately position the tip of the speed sensor 234 adjacent to the webs 229a, the speed sensor 234 may be provided with conventional position adjusting means. Such means have been previously employed in conjunction with speed sensors disposed inside e.g. automatic transmissions and differentials.

The controller 239 operates in a similar manner as the controller 39 described earlier (see FIG. 3). However, only the variable "beta" is employed to determine the presence of an incipient wheel skid condition and to determine whether the brake force control means is providing too much braking. That is, the controller determines the derivative of the rotational wheel deceleration with respect to the hydraulic braking force (as described above) and uses this derivative ("beta") to effect brake force control. (It will be understood that the formulation of the variable "beta" described above is given as an example only. In the broadest sense, the variable "beta" may be formulated in any manner so as to be indicative of a relationship between the rate of change of brake force and the rate of change of wheel rotational deceleration.)

The controller 239 is electrically connected to each stack of the piezoelectric discs 233 via signal lines 233s. In this embodiment, the signals (i.e. movements of electrical charge) in the lines 233s preferably not only provide the means for expanding and contracting the piezoelectric discs to effect brake force control, but they also provide means for determining the hydraulic pressure within the wheel cylinders 226a of the caliper 226. This is accomplished by employing the control arrangement shown in FIG. 8.

Figure 8:
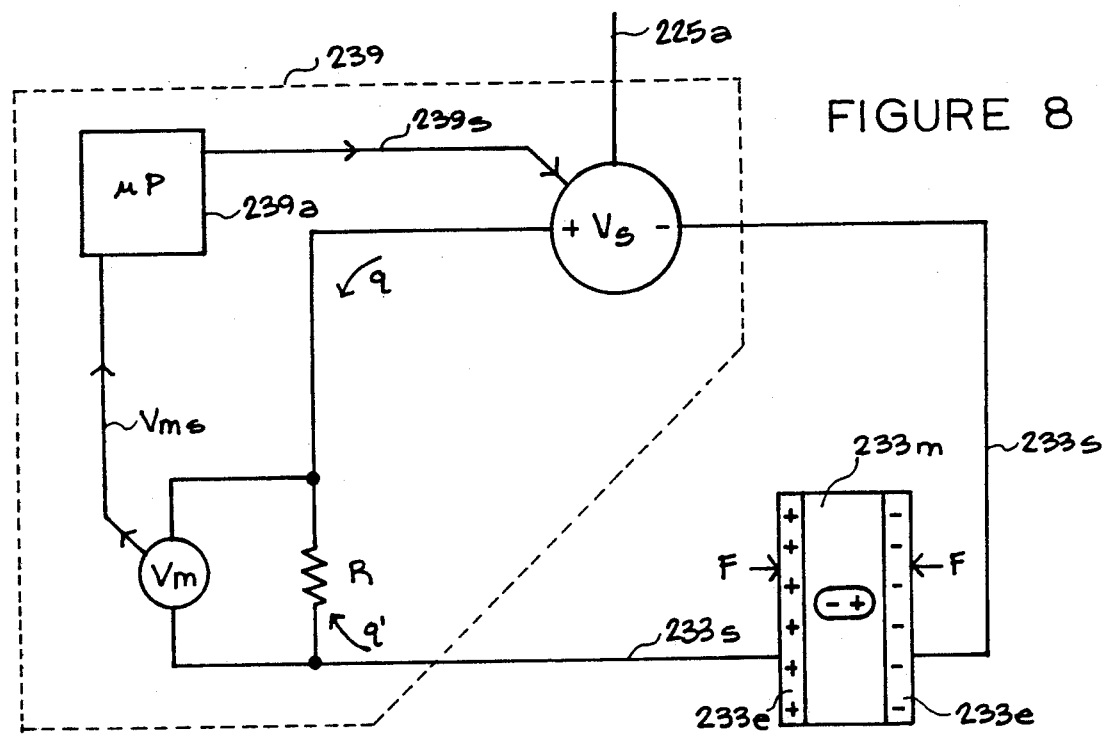
FIGS. 8 reveals the electrical arrangement for driving the piezoelectric discs in the embodiments of FIGS. 7a and 7b.

In FIG. 8, the controller 239 is shown in phantom lines and comprises a microprocessor 239a (or other equivalent means) which controls a variable voltage source Vs. The voltage source Vs receives a supply voltage from the line 225a and is employed for driving the stacks of piezoelectric discs 233 (although for simplicity, only one of the several discs which are normally disposed in parallel is shown in the Figure). Each piezoelectric disc comprises a pair of conducting electrodes 233e which store electrical charge and which are electrically connected to the signal lines 233s. The electrodes 233e sandwich a layer of piezoelectric crystalline material 233m. A control resistor R is disposed in series between the voltage source Vs and the piezoelectric discs, and a voltage meter Vm is employed to sense the presence of a voltage differential across the resistor R. The microprocessor 239a, through sensing the magnitude of the voltage differential across the resistor R and controlling the voltage potential of the source Vs, can determine (e.g. through an integration procedure as explained below) the compressive force F exerted by the hydraulic fluid pressure on the piezoelectric discs, and hence, the hydraulic braking force exerted by the brake fluid in the caliper.

When a voltage V is initially applied by the voltage source to expand the piezoelectric discs, a current (e.g. flow-rate) of conventional charge q will flow counterclockwise in FIG. 8, as indicated by the arrow, thereby producing an electrical potential at Vm (as predicted by Ohm's Law). If this electrical potential at Vm is integrated with respect to time, then an indication of the magnitude of the total flow of charge q (e.g. in Coulombs) to the piezoelectric discs is attained.

If, for analysis purposes, it is assumed that no pressure develops in the wheel cylinder when the potential V is initially applied, then the total flow of charge q would be equal to the product of V and the unclamped capacity (or capacitance) Co of the piezoelectric discs. This total flow of charge, hereinafter called QMAX, represents the flow of charge produced from a given potential V when no force is applied to the piezoelectric discs.

Next, it is assumed that a hydraulic pressure is applied in the wheel cylinder to produce a force F that compresses the expanded piezoelectric discs. Such a force F generates a (piezoelectrically induced) voltage potential from the piezoelectric discs which causes an incremental clockwise current of charge q'. (Assuming that the electric field remains constant during the application of the force F, then the incremental clockwise current of charge q' will be proportional to the rate of change of stress in the piezoelectric discs caused by the force F.) This current of charge q' will cause an additional voltage differential, as sensed at Vm, to occur across the resistor R. The time integral of this additional voltage differential represents the total magnitude of the flow of charge q' (e.g. in Coulombs) and is directly indicative of the increase in compressive force applied to the piezoelectric discs 239.

A thorough teaching on how to utilize piezoelectric elements as electro-mechanical transducers and a compilation of the properties and proportionality constants of piezoelectric materials are given by Berlincourt et al. in Mason, Warren P., Ed., *Physical Acoustics*, Academic Press, New York (1964), Volume 1A at pages 169 to 256, incorporated by reference herein. Here however, it will suffice to say that if a piezoelectric element is simultaneously subjected to a time-varying electric field E and a time-varying mechanical force F, then $$(dE/dt) = -C_1(dT/dt) + C_2(dD/dt),$$

wherein $C_1$ and $C_2$ are known proportionality constants determined by the material properties of the piezoelectric element, T is the stress in the piezoelectric element, and D is the displacement of the piezoelectric element. Since the magnitude of the electric field E may be determined by the microprocessor 239a, and since the displacement D is indicated by the amount of charge stored in the piezoelectric element (e.g. the amount of charge which has flowed to and remained in the piezoelectric element), which may be determined by e.g. integrating the voltage differential across the resistor R, the above equation may be solved for T. The stress T in the piezoelectric element is, of course, indicative of the hydraulic pressure in the wheel cylinder.

According to the invention, the microprocessor (or equivalent means) 239a produces a control signal 239s for controlling the voltage potential created in the voltage source Vs and receives a signal Vms from the voltage meter Vm indicative of the voltage potential across the resistor R. Additionally, the value of the capacitance Co for the piezoelectric discs is stored in the memory of the microprocessor (or else it may be determined by the microprocessor by applying a known voltage V to the piezoelectric discs and simultaneously integrating Vms to determine QMAX when it is known that the piezoelectric discs are not under a compressive load).

In operation, the microprocessor continually determines the correct voltage output V of the voltage source Vs (e.g. according to the brake force control routine shown in FIG. 3; however, in this embodiment, step 112 may be skipped, in which case step 114 would immediately follow step 111). Moreover, the microprocessor continually determines the voltage applied to the piezoelectric discs (e.g. the voltage output V minus the magnitude of voltage developed across the resistor R at the voltage meter Vm). From the voltage applied to the piezoelectric discs and the capacitance Co, the microprocessor also continually determines QMAX and the time derivative of QMAX. From the voltage meter signal Vms, the microprocessor continually determines (according to Ohm's Law) the magnitude (and direction) of electrical current i passing through the resistor R. The microprocessor also continually subtracts the derivative of QMAX from the magnitude of electrical current i to determine a flow rate of piezoelectrically induced charge PIC' (which is proportional to the rate of change of hydraulic braking pressure). Lastly, the microprocessor continually integrates PIC' with respect to time to obtain q'. The magnitude of q', as stated earlier, is indicative of the compressive force exerted on the piezoelectric discs 239, and thus is used to determine the hydraulic pressure in the brake caliper.

In FIG. 7b, a conventional brake system comprising a "floating caliper" 326 and a wheel-mounted ventilated brake disc 329 is shown. However, an after-market anti-lock brake system according to the invention has been applied to the conventional brake system. Specifically, a module MD2 has been interposed between a metal brake 325a line leading from the master cylinder 323 to a wheel well WW and a flexible brake line 325b leading to a wheel cylinder 326a of the caliper. A signal line 322s from a brake pedal switch (shown schematically at 322) has been connected to a controller 339 of the module. The module MD2 has also been secured (e.g. by adhesives) to the wheel well WW, or other convenient portion) of the automobile. In conjunction with a wheel speed sensor 334 which has been secured to an edge of the caliper (e.g. by adhesives) so as to sense the passing of webs 329a in the disc 329, the module MD2 is effective to provide brake force control means for the caliper 326 without necessitating any significant modification thereof.

The module MD2 comprises an inlet IN connected to one end of a short length of flexible brake line 325a', the other end of which has been connected to a fitting on the metal brake line 325a. The inlet IN communicates directly with valve means 331, 332 (similar in arrangement and function to the valves 31, 32 in FIG. 2) which normally allows two way fluid communication between the caliper 326 and a master cylinder (upstream of the brake line 325a), but which is controllable by the controller 339 (in the manner described with reference to the valves 31, 32 in FIG. 2) so as to allow only a flow of brake fluid from the caliper 326 to the master cylinder when brake force control is being effected e.g. according to the flow chart shown in FIG. 3 (again, omitting the step 112 if desired). In this embodiment the controller 339 is located within the module MD2, but this is not necessary.

Downstream of the valve means 331, 332 and within the module is disposed an auxiliary expansion chamber AEC. A stack of piezoelectric discs 333 is disposed on an inner wall of the chamber AEC and is controllable by the controller 339 in the manner described with respect to FIG. 8 above. The controller 339 receives electrical power from the vehicle battery. An inlet of the chamber AEC communicates directly with the valve means 331, 332 while an outlet of the chamber, which constitutes the outlet OUT of the module MD2, is in direct fluid communication with the flexible brake line 325b. As seen in the Figure, the flexible brake line 325b is secured to a fitting provided on the outside of the module housing at the outlet OUT.

In operation, the controller 339 (which may comprise a microprocessor or an analog circuit) receives signals indicative of the rotational wheel speed and the hydraulic fluid pressure in the chamber AEC (which, for all intents and purposes equals the pressure in the wheel cylinder of the floating caliper 326) from the wheel speed sensor 334 and the stack of piezoelectric discs 333 (as described above with reference to FIG. 8), respectively. From these signals, the controller 339 determines "beta" (or a quantity representative thereof) and effects brake force control (by controlling the valve means 331, 332 and the stack of piezoelectric discs 333) according to the manner described in conjunction with FIG. 3. (In a modification, the controller 339 may effect feedback control of the piezoelectric disc stack 333 to maintain "beta" at or below a predetermined level indicative of the onset of a wheel skid condition. Alternately, the controller 339 may determine the presence of an incipient wheel skid condition based on the signal from the wheel speed sensor 334 alone, as is conventional in current anti-lock brake control systems. Specifically, the controller senses the magnitude of the rotational deceleration of the wheel. When this deceleration magnitude exceeds a predetermined value, a skid condition is assumed to exist and the brake force control means is controlled to effect quick reduction of the brake pressure e.g. by closing the valve 331 and contracting the piezoelectric discs. While the brake pressure is reduced, the rotational wheel speed increases. The controller thus maintains a reduced brake pressure until it determines that the rotational wheel speed corresponds to an estimated longitudinal velocity of the vehicle. Thereafter, the controller controls the brake force control means to effect full reapplication of the brakes e.g. by opening the valve 331 and expanding the piezoelectric discs. Thus, skid control is effected through modulation of the brake pressure. Such conventional control systems are disclosed in the previously mentioned patent documents, as well as in U.S. Pat. No. 4,917,444 and SAE paper #741083, also both incorporated by reference herein.)

Although the embodiments of FIGS. 7a and 7b have been described with certain particularity, many modifications are envisioned. For example, if a floating caliper assembly comprising a single wheel cylinder piston and an opposed caliper flange is employed in the embodiment of FIG. 7a, then it may be advantageous to employ a stack of piezoelectric discs only between the caliper flange and its associated brake pad. Furthermore, in addition to the features and modifications described with respect to FIG. 2, it is possible to modify these e.g. after-market anti-lock brake systems by providing one central controller for all of the vehicle wheels. In such a system, it would be desirable to provide the vehicle with an accelerometer for measuring the longitudinal deceleration of the vehicle and to control the brake force control means according to the complete control routine shown in FIGS. 3 and 5. Moreover, it would be obvious to effect the control routine of FIGS. 3 and 5 not based on whether "beta" exceeded a predetermined value, but rather, based on whether the time derivative thereof, "beta prime", exceeded (or fell below) a predetermined value. The use of "beta prime" in an aftermarket system would be advantageous because it would minimize the sensitivity of the brake force control means to differences in wheel size, vehicle weight, etc. of the vehicles to which the anti-lock brake system is applied. The value of "beta prime" always increases (from near zero) at a transition from rolling to skidding and always decreases (e.g. becomes negative) at a transition from skidding back to rolling.

In conclusion, the present invention is suitable for use in all kinds of wheeled vehicles, such as cars, motorcycles, trains, and airplanes. If the invention is used in trains or other electric vehicles, then it will be advantageous to employ a conventional regenerative braking system as the primary vehicle braking system. The anti-lock braking system according to the present invention would then be used to supplement the regenerative braking system e.g. at low vehicle speeds or during rapid deceleration.

Although the present invention has been described with certain particularity, it is not meant to be limited to the above described embodiments. The invention shall therefore encompass the described embodiments and any modifications thereof which will fall within the scope of the appended claims.

I claim:

1. An anti-lock brake system for a vehicle comprising:
    a master cylinder having a master cylinder piston mounted for reciprocal movement therein;
    actuating means for moving the master cylinder piston when an operator of the vehicle operates a vehicle brake actuating device;
    a wheel cylinder having a wheel cylinder piston which is mounted for reciprocal movement therein;
    a rotatable brake element connected for rotation with a wheel of the vehicle;
    a non-rotatable brake element interposed between the wheel cylinder piston and the rotatable brake element;
    a hydraulic link comprising a volume of constrained working fluid interposed between the master cylinder piston and the wheel cylinder piston so as to hydraulically link movement of the master cylinder piston with movement of the wheel cylinder piston, whereby
    when the vehicle operator operates the vehicle brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle;
    valve means provided in the hydraulic link for controlling a condition of fluid communication between the master cylinder and the wheel cylinder, wherein
    the valve means is controllable to selectively provide either one of a first condition which allows two way fluid communication between the master cylinder and the wheel cylinder and a second condition which allows exclusive one way fluid communication from the wheel cylinder to the master cylinder, wherein, an upstream portion of the hydraulic link is defined between the master cylinder piston and the valve means and a downstream portion of the hydraulic link is defined between the wheel cylinder piston and the valve means, and wherein the downstream portion of the hydraulic link defines an internal volume within which the working fluid is substantially constrained when the movement of the wheel cylinder piston has urged the non-rotatable brake member into frictional engagement with the rotatable brake member;

piezoelectric means, comprising at least one piezoelectric element to which a voltage potential is applied, for increasing and decreasing the internal volume of the downstream portion of the hydraulic link in response to changes in a magnitude of the voltage potential applied to the piezoelectric element;

wheel speed sensing means for producing a wheel speed signal indicative of a rotational speed of the wheel; and a controller electrically connected to the valve means, the piezoelectric means, and the wheel speed sensing means;

wherein the controller comprises:

skid determining means for determining the existence of an incipient wheel skid condition at the vehicle wheel on the basis of at least the wheel speed signal;

normal braking mode control means, operative when the incipient wheel skid condition does not exist, for controlling the valve means to provide the first condition of fluid communication between the master cylinder and the wheel cylinder;

cut-off means, responsive to the determined existence of the incipient wheel skid condition, for controlling the valve means to provide the second condition of fluid communication between the master cylinder and the wheel cylinder;

piezoelectric element contracting means, operative after the second condition of fluid communication has been established, for controlling the magnitude of the voltage potential applied to the piezoelectric element so as to cause the piezoelectric element to contract, thereby increasing the internal volume of the downstream portion and reducing a hydraulic pressure in the wheel cylinder to alleviate the incipient wheel skid condition;

means for sensing an alleviation of the incipient wheel skid condition, on the basis of at least the wheel speed signal;

piezoelectric element expanding means, responsive to the sensed alleviation of the incipient wheel skid condition, for controlling the voltage potential applied to the piezoelectric element so as to cause the piezoelectric element to expand, thereby decreasing the internal volume of the downstream portion and increasing the hydraulic pressure in the wheel cylinder;

monitoring means for monitoring the voltage potential applied to the piezoelectric element by the piezoelectric element expanding means; and normal braking resume means for controlling the valve means to provide the first condition of fluid communication between the upstream portion and the downstream portion of the hydraulic link when the voltage potential applied to the piezoelectric element by the piezoelectric element expanding means has reached a predetermined voltage potential, wherein the valve means and the piezoelectric means are provided within a module attached to a portion of the vehicle in such a manner that the piezoelectric means is located within an auxiliary chamber of the module downstream of the valve means, wherein the upstream portion comprises a first brake line section, the downstream portion comprises a second brake line section, wherein the second brake line section comprises a flexible brake line, and wherein the module is interposed between the first brake line section and the second brake line section.

2. An anti-lock brake system as recited in claim 1, wherein the rotatable brake element comprises a ventilated brake disc having a plurality of circumferentially spaced webs which join together a pair of disc faces, and wherein the wheel speed sensing means is positioned so as to sense the passing of the webs as the vehicle wheel rotates, thereby producing the wheel speed signal based on a frequency of the passing webs.

3. An anti-lock brake system as recited in claim 1, wherein means are provided for determining a magnitude of a hydraulic force acting on the wheel cylinder piston, and wherein the skid determining means determines the existence of the incipient wheel skid condition based on both the wheel speed signal and the determined hydraulic force acting on the wheel cylinder piston.

4. An anti-lock brake system as recited in claim 3, wherein the skid determining means determines a quantity representative of a ratio between a rate of change of the determined hydraulic force and a rate of change of rotational deceleration of the wheel as determined from the wheel speed signal, wherein the quantity is then used by the skid determining means, according to a mathematical relation, to determine the existence of the incipient wheel skid condition.

5. An anti-lock brake system as recited in claim 3, wherein the means for determining the hydraulic force acting on the wheel cylinder piston comprises the at least one piezoelectric element of the piezoelectric means.

6. An anti-lock brake system as recited in claim 1, wherein the vehicle brake actuating device comprises a brake pedal and wherein switch means are provided for providing a signal to the controller upon initial depression of the brake pedal, and wherein the controller further comprises:

expanding means responsive to the signal from the switch means for applying a voltage to the piezoelectric element to expand the piezoelectric element upon the initial depression of the brake pedal, thereby decreasing a response time of the brake system.

7. An anti-lock brake system as recited in claim 1, wherein the module is attached to a body portion of the vehicle.

8. An anti-lock brake system as recited in claim 1, wherein the module is attached to a wheel well of the vehicle.

9. An anti-lock brake system for a vehicle comprising:
a master cylinder having a master cylinder piston mounted for reciprocal movement therein;
actuating means for moving the master cylinder piston when an operator of the vehicle operates a vehicle brake actuating device;

a wheel cylinder having a wheel cylinder piston which is mounted for reciprocal movement therein;

a rotatable brake element connected for rotation with a wheel of the vehicle;

a non-rotatable brake element interposed between the wheel cylinder piston and the rotatable brake element;

a hydraulic link comprising a volume of constrained working fluid interposed between the master cylinder piston and the wheel cylinder piston so as to hydraulically link movement of the master cylinder piston with movement of the wheel cylinder piston, whereby when the vehicle operator operates the vehicle brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle;

valve means provided in the hydraulic link for controlling a condition of fluid communication between the master cylinder and the wheel cylinder, wherein the valve means is controllable to selectively establish one of a first condition which allows two way fluid communication between the master cylinder and the wheel cylinder and a second condition which prevents fluid communication from the master cylinder to the wheel cylinder, wherein, an upstream portion of the hydraulic link is defined between the master cylinder piston and the valve means and a downstream portion of the hydraulic link is defined between the wheel cylinder piston and the valve means, and wherein the downstream portion of the hydraulic link defines an internal volume within which the working fluid is substantially constrained when the movement of the wheel cylinder piston has urged the non-rotatable brake member into frictional engagement with the rotatable brake member;

piezoelectric means, comprising at least one piezoelectric element to which a voltage potential is applied, for increasing and decreasing the internal volume of the downstream portion of the hydraulic link in response to changes in a magnitude of the voltage potential applied to the piezoelectric element;

wheel speed sensing means for producing a wheel speed signal indicative of a rotational speed of the wheel; and a controller electrically connected to the valve means, the piezoelectric means, and the wheel speed sensing means;

wherein the controller comprises:

skid determining means for determining the existence of an incipient wheel skid condition at the vehicle wheel on the basis of at least the wheel speed signal;

normal braking mode control means, operative when the incipient wheel skid condition does not exist, for controlling the valve means to establish the first condition;

cut-off means, responsive to the determined existence of the incipient wheel skid condition, for controlling the valve means to establish the second condition;

piezoelectric element contracting means, operative after the second condition has been established, for controlling the magnitude of the voltage potential applied to the piezoelectric element so as to cause the piezoelectric element to contract, thereby increasing the internal volume of the downstream portion and reducing a hydraulic pressure in the wheel cylinder to provide an alleviation of the incipient wheel skid condition;

means for sensing an alleviation of the incipient wheel skid condition, on the basis of at least the wheel speed signal; and piezoelectric element expanding means, responsive to the sensed alleviation of the incipient wheel skid condition, for controlling the voltage potential applied to the piezoelectric element so as to cause the piezoelectric element to expand, thereby decreasing the internal volume of the downstream portion;

wherein the rotatable brake element comprises a ventilated brake disc having a plurality of circumferentially spaced webs which join together a pair of disc faces, wherein the wheel cylinder is provided within a disc brake caliper, and wherein the wheel speed sensing means is mounted on the disc brake caliper and is located adjacent to the ventilated brake disc so as to sense a passing of the webs as the vehicle wheel rotates, thereby producing the wheel speed signal based on a frequency of the passing webs.

10. An anti-lock brake system as recited in claim 9, wherein the valve means comprises a one-way valve which is effective to permit one way fluid communication from the wheel cylinder to the master cylinder when the second condition is established, and wherein the controller further comprises:

monitoring means for monitoring the voltage potential applied to the piezoelectric element by the piezoelectric element expanding means; and normal braking resume means for controlling the valve means to establish the first condition when the voltage potential applied to the piezoelectric element by the piezoelectric element expanding means has reached a predetermined voltage potential.

11. An anti-lock brake system for a vehicle comprising:

a master cylinder having a master cylinder piston mounted for reciprocal movement therein;

actuating means for moving the master cylinder piston when an operator of the vehicle operates a vehicle brake actuating device;

a wheel cylinder having a wheel cylinder piston which is mounted for reciprocal movement therein;

a rotatable brake element connected for rotation with a wheel of the vehicle;

a non-rotatable brake element interposed between the wheel cylinder piston and the rotatable brake element;

a hydraulic link comprising a volume of constrained working fluid interposed between the master cylinder piston and the wheel cylinder piston so as to hydraulically link movement of the master cylinder piston with movement of the wheel cylinder piston, whereby when the vehicle operator operates the vehicle brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle;

valve means provided in the hydraulic link for controlling a condition of fluid communication between the master cylinder and the wheel cylinder, wherein the valve means is controllable to selectively establish one of a first condition which allows two way fluid communication between the master cylinder and the wheel cylinder and a second condition which prevents fluid communication from the master cylinder to the wheel cylinder, wherein, an upstream portion of the hydraulic link is defined between the master cylinder piston and the valve means and a downstream portion of the hydraulic link is defined between the wheel cylinder piston and the valve means, and wherein the downstream portion of the hydraulic link defines an internal volume within which the working fluid is substantially constrained when the movement of the wheel cylinder piston has urged the non-rotatable brake member into frictional engagement with the rotatable brake member;

piezoelectric means, comprising at least one piezoelectric element to which a voltage potential is applied, for increasing and decreasing the internal volume of the downstream portion of the hydraulic link in response to changes in a magnitude of the voltage potential applied to the piezoelectric element;

wheel speed sensing means for producing a wheel speed signal indicative of a rotational speed of the wheel; and a controller electrically connected to the valve means, the piezoelectric means, and the wheel speed sensing means;

wherein the controller comprises:

skid determining means for determining the existence of an incipient wheel skid condition at the vehicle wheel on the basis of at least the wheel speed signal;

normal braking mode control means, operative when the incipient wheel skid condition does not exist, for controlling the valve means to establish the first condition;

cut-off means, responsive to the determined existence of the incipient wheel skid condition, for controlling the valve means to establish the second condition;

piezoelectric element contracting means, operative after the second condition has been established, for controlling the magnitude of the voltage potential applied to the piezoelectric element so as to cause the piezoelectric element to contract, thereby increasing the internal volume of the downstream portion and reducing a hydraulic pressure in the wheel cylinder to provide and alleviation of the incipient wheel skid condition;

means for sensing an alleviation of the incipient wheel skid condition, on the basis of at least the wheel speed signal;

piezoelectric element expanding means, responsive to the sensed alleviation of the incipient wheel skid condition, for controlling the voltage potential applied to the piezoelectric element so as to cause the piezoelectric element to expand, thereby decreasing the internal volume of the downstream portion;

wherein the vehicle brake actuating device comprises a brake pedal and wherein switch means are provided for supplying a signal to the controller upon initial depression of the brake pedal, and wherein the controller further comprises:

initial depression expanding means responsive to the signal from the switch means for applying a voltage to the piezoelectric element to expand the piezoelectric element upon the initial depression of the brake pedal, thereby decreasing a response time of the brake system.

12. An anti-lock brake system as recited in claim 11, wherein the valve means comprises a one way valve which is effective to permit one way fluid communication from the wheel cylinder to the master cylinder when the second condition is established, and wherein the controller further comprises:

monitoring means for monitoring the voltage potential applied to the piezoelectric element by the piezoelectric element expanding means; and normal braking resume means for controlling the valve means to establish the first condition when the voltage potential applied to the piezoelectric element by the piezoelectric element expanding means has reached a predetermined voltage potential.

13. An anti-lock brake system as recited in claim 12, wherein the predetermined voltage potential is equal to the voltage which is applied to the piezoelectric element by the initial depression expanding means.

14. An anti-lock brake system for a vehicle comprising:

a master cylinder having a master cylinder piston mounted for reciprocal movement therein;

actuating means for moving the master cylinder piston when an operator of the vehicle operates a vehicle brake actuating device;

a wheel cylinder having a wheel cylinder piston which is mounted for reciprocal movement therein;

a rotatable brake element connected for rotation with a wheel of the vehicle;

a non-rotatable brake element interposed between the wheel cylinder piston and the rotatable brake element;

a hydraulic link comprising a volume of constrained working fluid interposed between the master cylinder piston and the wheel cylinder piston so as to hydraulically link movement of the master cylinder piston with movement of the wheel cylinder piston, whereby when the vehicle operator operates the vehicle brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle;

valve means provided in the hydraulic link for controlling a condition of fluid communication between the master cylinder and the wheel cylinder, wherein the valve means is controllable to selectively establish one of a first condition which allows two way fluid communication between the master cylinder and the wheel cylinder and a second condition which prevents fluid communication from the master cylinder to the wheel cylinder, wherein, an upstream portion of the hydraulic link is defined between the master cylinder piston and the valve means and a downstream portion of the hydraulic link is defined between the wheel cylinder piston and the valve means, and wherein the downstream portion of the hydraulic link defines an internal volume within which the working fluid is substantially constrained when the movement of the wheel cylinder piston has urged the non-rotatable brake member into frictional engagement with the rotatable brake member;

piezoelectric means, comprising at least one piezoelectric element to which a voltage potential is applied, for increasing and decreasing the internal volume of the downstream portion of the hydraulic link in response to changes in a magnitude of the voltage potential applied to the piezoelectric element;

wherein the voltage potential is produced by a voltage source and is applied to the at least one piezoelectric element via an electrical circuit;

current sensing means for producing a signal representative of a magnitude and a direction of a flow of electrical charge in the electrical circuit between the voltage source and the at least one piezoelectric element;

wheel speed sensing means for producing a wheel speed signal indicative of a rotational speed of the wheel; and a controller electrically connected to the piezoelectric means via the electrical circuit and to the valve means and the wheel speed sensing means;

wherein the controller comprises:

hydraulic force determining means for producing a signal indicative of a rate of change of magnitude of a hydraulic force developed in the wheel cylinder on the basis of the signal produced by the current sensing means;

skid determining means, responsive to at least the wheel speed signal and the signal indicative of the rate of change of the magnitude of the hydraulic force developed in the wheel cylinder, for determining the existence of an incipient wheel skid condition at the vehicle wheel;

normal braking mode control means, operative when the incipient wheel skid condition does not exist, for controlling the valve means to establish the first condition;

cut-off means, responsive to the determined existence of the incipient wheel skid condition, for controlling the valve means to establish the second condition;

piezoelectric element contracting means, operative after the second condition has been established, for controlling the magnitude of the voltage potential applied to the piezoelectric element so as to cause the piezoelectric element to contract, thereby increasing the internal volume of the downstream portion and reducing a hydraulic pressure in the wheel cylinder to provide and alleviation of the incipient wheel skid condition;

means for sensing an alleviation of the incipient wheel skid condition, on the basis of at least the wheel speed signal; and piezoelectric element expanding means, responsive to the sensed alleviation of the incipient wheel skid condition, for controlling the voltage potential applied to the piezoelectric element so as to cause the piezoelectric element to expand, thereby decreasing the internal volume of the downstream portion.

15. An anti-lock brake system as recited in claim 14, wherein the valve means comprises a one way valve which is effective to permit one way fluid communication from the wheel cylinder to the master cylinder when the second condition is established, and wherein the controller further comprises:

monitoring means for monitoring the voltage potential applied to the piezoelectric element by the piezoelectric element expanding means; and normal braking resume means for controlling the valve means to establish the first condition when the voltage potential applied to the piezoelectric element by the piezoelectric element expanding means has reached a predetermined voltage potential.

16. An anti-lock brake system as recited in claim 14, wherein skid determining means determines a quantity representative of a ratio between a rate of change of the magnitude of the hydraulic force developed in the wheel cylinder and a rate of change of rotational deceleration of the wheel as determined from the wheel speed signal, wherein the quantity is then used by the skid determining means, according to a mathematical relation, to determine the existence of the incipient wheel skid condition.

17. An anti-lock brake system as recited in claim 16, wherein the existence of the incipient wheel skid condition is determined when the quantity has attained a first predetermined value, and wherein the alleviation of the incipient wheel skid condition is sensed when the quantity has attained a second predetermined value different from the first predetermined value.

18. An anti-lock brake system for a vehicle comprising:

a master cylinder having a master cylinder piston mounted for reciprocal movement therein;

actuating means for moving the master cylinder piston when an operator of the vehicle operates a vehicle brake actuating device;

a wheel cylinder having a wheel cylinder piston which is mounted for reciprocal movement therein;

a rotatable brake element connected for rotation with a wheel of the vehicle;

a non-rotatable brake element interposed between the wheel cylinder piston and the rotatable brake element;

a hydraulic link comprising a volume of constrained working fluid interposed between the master cylinder piston and the wheel cylinder piston so as to hydraulically link movement of the master cylinder piston with movement of the wheel cylinder piston, whereby when the vehicle operator operates the vehicle brake actuating device in order to slow down the vehicle, the movement of the master cylinder piston causes a corresponding movement of the wheel cylinder piston which urges the non-rotatable brake member to frictionally engage the rotatable brake member, thereby slowing down the vehicle;

valve means provided in the hydraulic link for controlling a condition of fluid communication between the master cylinder and the wheel cylinder, wherein the valve means is controllable to selectively establish either one of a first condition which allows two way fluid communication between the master cylinder and the wheel cylinder and a second condition which prevents one way fluid communication from the master cylinder to the wheel cylinder, wherein, an upstream portion of the hydraulic link is defined between the master cylinder piston and the valve means and a downstream portion of the hydraulic link is defined between the wheel cylinder piston and the valve means, and wherein the downstream portion of the hydraulic link defines an internal volume within which the working fluid is substantially constrained when the movement of the wheel cylinder piston has urged the non-rotatable brake member into frictional engagement with the rotatable brake member;

piezoelectric means, comprising at least one piezoelectric element to which a voltage potential is applied, for increasing and decreasing the internal volume of the downstream portion of the hydraulic link in response to changes in a magnitude of the voltage potential applied to the at least one piezoelectric element;

hydraulic force determining means for producing a signal indicative of a rate of change of a hydraulic force developed in the wheel cylinder on the basis of a detected rate of change of compressive stress in the at least one piezoelectric element;

wheel speed sensing means for producing a wheel speed signal indicative of a rotational speed of the wheel; and a controller electrically connected to the valve means, the piezoelectric means, and the wheel speed sensing means;

wherein the controller comprises:

skid determining means for determining existence of an incipient wheel skid condition at the vehicle wheel on the basis of at least the wheel speed signal and the signal indicative of the rate of change of the hydraulic force developed in the wheel cylinder;

normal braking mode control means, operative when the incipient wheel skid condition does not exist, for controlling the valve means to establish the first condition;

cut-off means, responsive to the determined existence of the incipient wheel skid condition, for controlling the valve means to establish the second condition;

piezoelectric element contracting means, operative after the second condition has been established, for controlling the magnitude of the voltage potential applied to the at least one piezoelectric element so as to cause the at least one piezoelectric element to contract, thereby increasing the internal volume of the downstream portion and reducing a hydraulic pressure in the wheel cylinder to provide an alleviation of the incipient wheel skid condition;

means for sensing the alleviation of the incipient wheel skid condition, on the basis of at least the wheel speed signal; and piezoelectric element expanding means, responsive to the sensed alleviation of the incipient wheel skid condition, for controlling the voltage applied to the at least one piezoelectric element so as to cause the at least one piezoelectric element to expand, thereby decreasing the internal volume of the downstream portion.

19. An anti-lock brake system as recited in claim 18, wherein the valve means comprises a one way valve which is effective to permit one way fluid communication from the wheel cylinder to the master cylinder when the second condition is established, and wherein the controller comprises:

monitoring means for monitoring the voltage potential applied to the at least one piezoelectric element by the piezoelectric element expanding means; and normal braking resume means for controlling the valve means to establish the first condition when the voltage potential applied to the piezoelectric element by the piezoelectric element expanding means has reached a predetermined voltage potential.

20. An anti-lock brake system as recited in claim 19, wherein the voltage potential is applied to the piezoelectric element through an electrical circuit, and wherein the hydraulic force determining means comprises:

means for measuring a flow of current in the electrical circuit;

means for obtaining a capacitance of the at least one piezoelectric element; and means for producing the signal indicative of the hydraulic force developed in the wheel cylinder on the basis of the flow of current in the electrical circuit, the capacitance of the at least one piezoelectric element, and the voltage potential applied to the at least one piezoelectric element.

* * * * *